(12) United States Patent
Darshan et al.

(10) Patent No.: US 7,898,406 B2
(45) Date of Patent: *Mar. 1, 2011

(54) POWERED DEVICE WITH PRIORITY INDICATOR

(75) Inventors: Yair Darshan, Petach Tikva (IL); Alon Ferentz, Bat Yam (IL); Dan Admon, Kiryat Tivon (IL); Yossi Shanava, Ramat Gan (IL); Roni Blaut, Netanya (IL); Poldi Rimboim, Brooklyn, NY (US); Ezra Koper, Gan Yavne (IL)

(73) Assignee: Microsemi Corp. - Analoged Mixed Signal Group Ltd, Hod Hasharon (IL)

( * ) Notice: Subject to any disclaimer, the term of this patent is extended or adjusted under 35 U.S.C. 154(b) by 1128 days.

This patent is subject to a terminal disclaimer.

(21) Appl. No.: 11/563,709

(22) Filed: Nov. 28, 2006

(65) Prior Publication Data

US 2007/0085675 A1 Apr. 19, 2007

Related U.S. Application Data

(63) Continuation-in-part of application No. 10/961,108, filed on Oct. 12, 2004, now Pat. No. 7,145,439.

(60) Provisional application No. 60/512,362, filed on Oct. 16, 2003.

(51) Int. Cl.
- *H04Q 1/30* (2006.01)
- *G05B 11/01* (2006.01)
- *G08B 13/12* (2006.01)
- *G05D 17/00* (2006.01)
- *H04B 1/38* (2006.01)

(52) U.S. Cl. ............ 340/538.11; 340/538; 340/310.11; 340/310.12; 340/568.2; 700/295; 700/297; 455/572

(58) Field of Classification Search .............. 340/310.1, 340/310.02, 310.05, 310.08, 568.2, 687, 340/410, 908, 286.01, 310.11, 310.12, 538, 340/538.11; 700/297, 295, 300; 455/572
See application file for complete search history.

(56) References Cited

U.S. PATENT DOCUMENTS

| | | | |
|---|---|---|---|
| 5,640,317 A | * | 6/1997 | Lei .............................. 363/49 |
| 6,115,468 A | | 9/2000 | De Nicolo |
| 6,140,911 A | | 10/2000 | Fisher et al. |
| 6,266,545 B1 | * | 7/2001 | Backman et al. ............ 455/572 |
| 6,473,608 B1 | | 10/2002 | Lehr et al. |

(Continued)

*Primary Examiner*—Daniel Wu
*Assistant Examiner*—Mark Rushing
(74) *Attorney, Agent, or Firm*—Haynes and Boone, LLP

(57) ABSTRACT

A method for communicating settable priority data from a powered device being powered over communication cabling to power sourcing equipment, the method comprising: prior to connecting power to operational circuitry of the powered device, transmitting first multi-bit data from the powered device to the power sourcing equipment; subsequent to the transmitted first multi-bit data, connecting power received over the communication cabling to the powered device operational circuitry; receiving information from the powered device operational circuitry; disconnecting the received power from the powered device operational circuitry; and subsequent to the disconnecting, and prior to reconnecting power to the operational circuitry, transmitting second multi-bit data from the powered device to the power sourcing equipment, the second multi-bit data being a function of the received information, at least one of the first multi-bit data and the second multi-bit data being a function of a settable priority.

31 Claims, 13 Drawing Sheets

U.S. PATENT DOCUMENTS

| | | |
|---|---|---|
| 6,496,103 B1 | 12/2002 | Weiss et al. |
| 6,535,983 B1 | 3/2003 | McCormack et al. |
| 6,643,566 B1 | 11/2003 | Lehr et al. |
| 6,650,622 B1 | 11/2003 | Austerman, III et al. |
| 6,909,943 B2 | 6/2005 | Lehr et al. |
| 6,954,708 B2 | 10/2005 | Rakshani et al. |
| 6,996,458 B2 * | 2/2006 | Pincu et al. .................. 700/297 |
| 7,145,439 B2 * | 12/2006 | Darshan et al. ......... 340/310.11 |
| 2003/0072438 A1 | 4/2003 | LeCreff et al. |
| 2003/0107269 A1 | 6/2003 | Jetzt |
| 2003/0185169 A1 | 10/2003 | Higgins |
| 2004/0062203 A1 | 4/2004 | Austermann, III et al. |

* cited by examiner

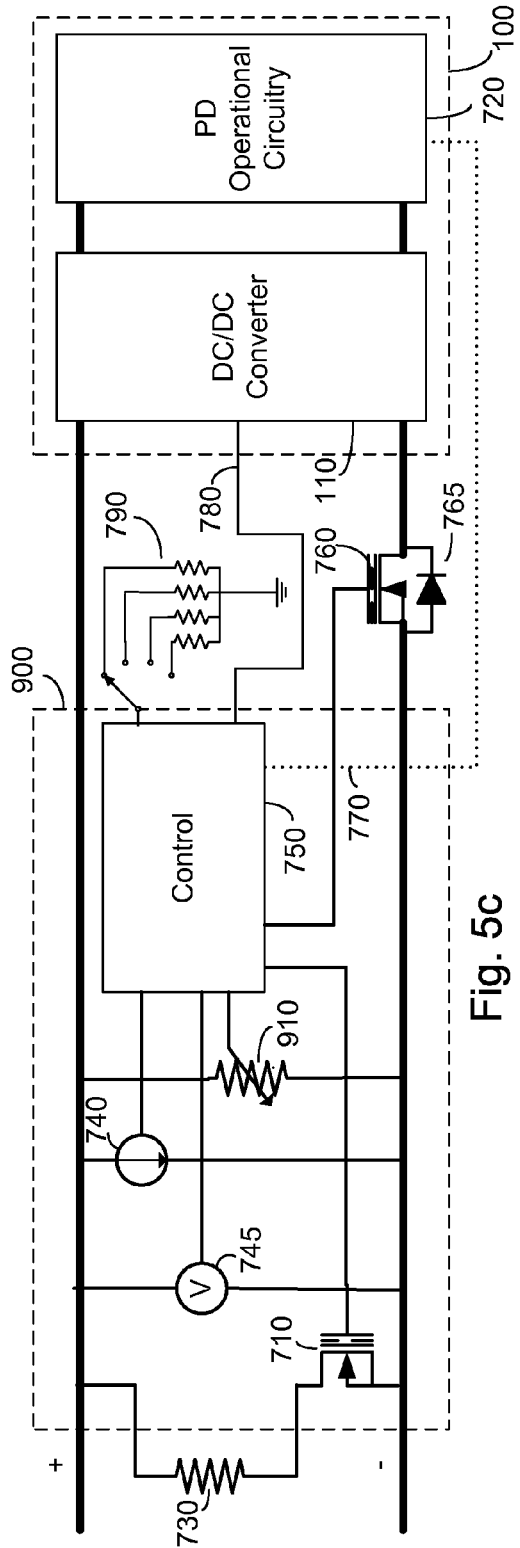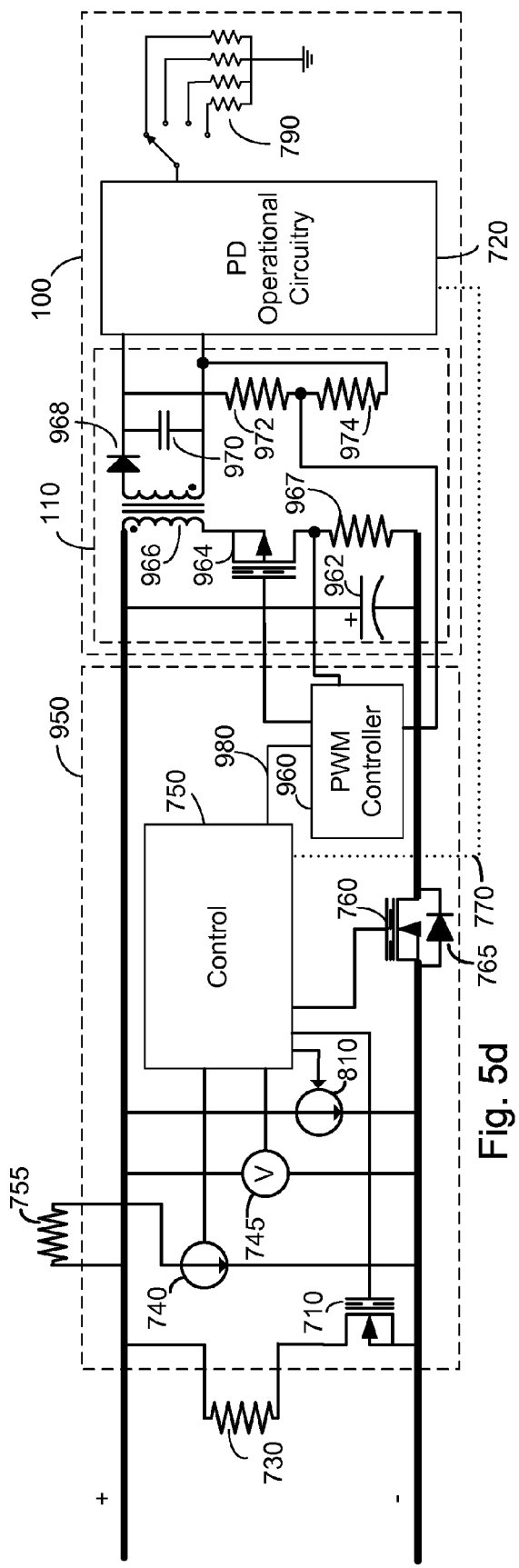
Fig. 5c
Fig. 5d

POWERED DEVICE WITH PRIORITY INDICATOR

RELATED APPLICATIONS

This application is a continuation in part of U.S. patent application Ser. No. 10/961,108, which claims priority from U.S. Provisional Patent Application Ser. No. 60/512,362 filed Oct. 16, 2003 entitled "POWERED DEVICE ASIC", the contents of both of which are incorporated herein by reference.

BACKGROUND OF THE INVENTION

The invention relates generally to the field of power over local area networks, particularly Ethernet based networks, and more particularly to a method of communicating a settable priority from a powered device to associated power sourcing equipment.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

The IEEE 802.3af-2003 standard, whose contents are incorporated herein by reference, is addressed to powering remote devices over an Ethernet based network. Power can be delivered to the powered device (PD) either directly from the switch/hub known as an endpoint power sourcing equipment (PSE) or alternatively via a midspan PSE. A PSE is defined as a device that provides power to a single link section.

The above mentioned standard prescribes a detection protocol to distinguish a compatible PD from non-compatible devices and precludes the application of power and possible damage to non-compatible devices. An optional classification protocol is prescribed, which enables classification of the power requirements of the PD to one of 5 classes. Of the 5 classes specified, 3 classes result in maximum power levels of the standard, namely 15.4 Watts at the output of the PSE. Thus, only 3 levels of power are supported by the classification protocol namely 4.0 Watts, 7.0 Watts and 15.4 Watts. Power is to be reserved by the PSE in accordance with the classification detected by the protocol.

The term PD is defined as a device that is either drawing power or requesting power from a PSE. Thus, a PD receives power, if available, from a PSE over the communication equipment. In a typical application, PD interface circuitry enabling the detection and optional classification is supplied. Power is isolated by the PD interface circuitry from the PD operational circuitry through an isolating switch, and is enabled to the PD operational circuitry only after the voltage at the PD, supplied from the PSE, rises to $V_{on}$. One function of the PD interface circuitry is thus to close the isolating switch thus enabling operation of the PD operational circuitry. In a typical application, the output of the isolating switch is fed to the input of a DC/DC converter, and the output of the DC/DC converter powers the PD operational circuitry.

The standard further prescribes a maximum turn on time, designated $t_{pon}$. In the event that the PSE powers the PD, power is to be supplied and a minimum current draw of 10 mA is to be monitored within $t_{pon}$ after completion of detection. After $t_{pon}$ a disconnect detection function is to be active in which the PSE is to monitor one or both of an AC maintain power signature and a DC maintain power signature.

No method of communicating information between the PD and the PSE is provided other than that provided by the detection and optional classification protocol. Thus, in the event that the PD power requirements are between the power levels supported by the classification protocol, power is to be reserved in excess of the actual power requirements. An increase in granularity would improve the overall power management of the PSE, and enable a larger number of PDs having power requirements less than the maximum power to be supported by a given PSE. Communication between the PD and the PSE would further enable the transfer of information such as PD temperature, priority of the PD, results of internal PD testing, PD configuration and PD type. Such information would advantageously enable improved power management and powering decisions.

U.S. Pat. No. 6,473,608 entitled "Structure Cabling System" issued Oct. 29, 2002 to Lehr et al. and U.S. Pat. No. 6,643,566 entitled "System for Power Delivery Over Data Communication Cabling Infrastructure" issued Nov. 4, 2003 to Lehr et al. the contents of both of which are incorporated herein by reference are addressed to the issue of supplying power to a PD over an Ethernet based network. No method of communication is described, and in particular no method of supplying increased classification granularity is described.

In a system operating according the IEEE 802.3af standard, preferably ports receiving power are assigned priority, as described in the above referenced U.S. Pat. No. 6,473,608. In the event of a shortage of power, preferably lower priority ports are disabled, or have power removed from them, prior to the disabling of higher priority ports. Priority is assigned to ports of the PSE, and in an exemplary embodiment priority is assigned by a configuration program in communication with the PSE.

Unfortunately, in actual practice, there is no certainty that the configuration program has been run. Additionally, any changes in wiring may not have been properly taken into account in assigning priority. Thus, there may be a situation where a port, which is to be assigned a high priority, receives a low priority assignment.

It would therefore be desirable to have a method of communicating priority from a PD to an associated PSE, while meeting the requirements of IEEE 802.3af. Thus, the installer of the PD, or alternatively an authorized user, would be empowered to assign a priority to the PD, which would follow the PD irrespective of connections.

SUMMARY OF THE INVENTION

Accordingly, it is a principal object of the present invention to overcome the disadvantages of prior art. This is provided in the present invention by enabling the transmission of information, comprising priority information, from PD interface circuitry to an associated PSE prior to supplying power to PD operational circuitry, in particular by not enabling a DC/DC converter of the PD operational circuitry. In one embodiment, communication occurs after the PSE enables the PD by supplying an appropriate voltage; however an isolating switch between the PD interface circuitry and the PD operational circuitry is kept open.

In another embodiment, subsequent to the communication, the isolating switch is closed thereby enabling the PD operational circuitry. Data is received by the PD interface circuitry from the PD operational circuitry, and subsequently the isolating switch is again opened, thereby disabling the PD operational circuitry. Data indicative of the information received from the PD operational circuitry is then communicated by the PD interface circuitry while the PD operational circuitry is disabled. The isolating switch is subsequently again closed thereby enabling the PD operational circuitry. The invention also enables a PSE operable to decipher the communication from the PD interface circuitry.

In one embodiment the priority information is supplied to the PD interface circuit, preferably by means of a user settable switch. In another embodiment the priority information is supplied to the PD operational circuitry, preferably by one of a user settable switch and a software routine. The priority information is utilized by the PSE to maintain power, or disable power, responsive to total power availability.

The invention provides for a method for communicating priority from a powered device interface associated with a powered device to power sourcing equipment, the method comprising: prior to connecting power to operational circuitry of the powered device, transmitting multi-bit data, from the powered device interface to the power sourcing equipment over the communication cabling, the multi-bit data comprising settable priority information.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 5c illustrates a high level block diagram of a third embodiment of a powered device in accordance with the principle of the current invention exhibiting an interface circuit, switch and associated powered device operating circuitry;

FIG. 5d illustrates a high level block diagram of a fourth embodiment of a powered device in accordance with the principle of the current invention exhibiting an interface circuit, switch and associated powered device operating circuitry;

DETAILED DESCRIPTION OF THE PREFERRED EMBODIMENTS

Figure 1A:
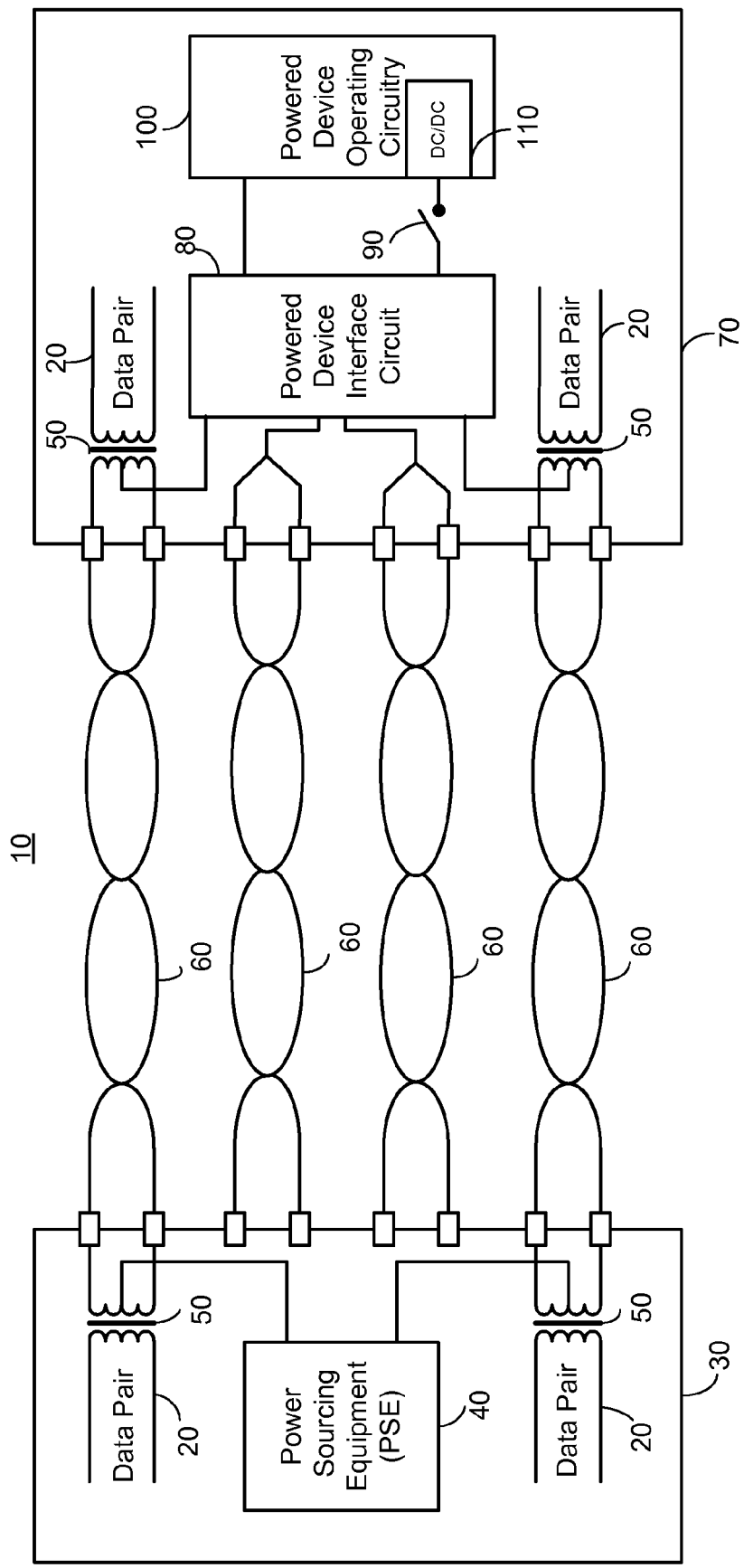
FIG. 1a illustrates a high level block diagram of a first alternative network configuration for remote powering from an endpoint PSE known to the prior art.

The present embodiments enable the transmission of information, comprising priority information, from PD interface circuitry to an associated PSE prior to supplying power to PD operational circuitry, in particular by not enabling a DC/DC converter of the PD operational circuitry. In one embodiment, communication occurs after the PSE enables the PD by supplying an appropriate voltage; however an isolating switch between the PD interface circuitry and the PD operational circuitry is kept open.

In another embodiment, subsequent to the communication, the isolating switch is closed thereby enabling the PD operational circuitry. Data is received by the PD interface circuitry from the PD operational circuitry, and subsequently the isolating switch is again opened, thereby disabling the PD operational circuitry. Data indicative of the information received from the PD operational circuitry is then communicated by the PD interface circuitry while the PD operational circuitry is disabled. The isolating switch is subsequently again closed thereby enabling the PD operational circuitry. The invention also enables a PSE operable to decipher the communication from the PD interface circuitry.

In one embodiment the priority information is supplied to the PD interface circuit, preferably by means of a user settable switch. In another embodiment the priority information is supplied to the PD operational circuitry, preferably by one of a user settable switch and a software routine. The priority information is utilized by the PSE to maintain power, or disable power, responsive to total power availability.

PD operational circuitry in accordance with the invention may comprise any of a: desktop computer; web camera; facsimile machine; IP telephone; computer; server; wireless LAN access point; emergency lighting system element; paging loudspeaker; CCTV camera; alarm sensor; door entry sensor; access control unit; laptop computer; hub; switch; router; monitor; memory back up unit for workstation; and memory back up unit for a computer.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3af compliant device preferably employing a 10Base-T, 100Base-T or 1000Base-T connection.

FIG. 1a illustrates a high level block diagram of a first alternative network configuration 10 for remote powering from an endpoint PSE known to the prior art. Network configuration 10 comprises: switch/hub equipment 30 comprising first and second data pairs 20, PSE 40, and first and second transformers 50; first, second, third and fourth twisted pair connections 60; and powered end station 70 comprising third and fourth transformers 50, third and fourth data pairs 20, powered device interface circuit 80, switch 90 and PD operating circuitry 100. PD operating circuitry 100 preferably comprises DC/DC converter 110, which typically comprises a high value input capacitor. A powered end station 70 is also denoted hereinafter interchangeably as a PD 70.

The primary of each of first and second transformers 50 carry respective data pairs 20. First and second outputs of PSE 40 are respectively connected to the center tap of the secondary of first and second transformers 50. The output leads of the secondary of first and second transformers 50 are respectively connected to a first end of first and second twisted pair connections 60. The second end of first and second twisted pair connections 60, are respectively connected to the primary of third and fourth transformers 50 located within powered end station 70. The center tap of the primary of each of third and fourth transformers 50 is connected to a respective input of power device interface circuit 80. A first output of powered device interface circuit 80 is connected to PD operating circuitry 100 through switch 90 at the input to DC/DC converter 110. A second output of powered device interface circuit 80 is connected to PD operating circuitry 100 as a return. The secondary of each of third and fourth transformers 50 carry third and fourth data pairs 20, respectively.

In operation, PSE 40 supplies power over first and second twisted pair connection 60, thus supplying both power and data over first and second twisted pair connections 60 to powered device interface circuit 80. Third and fourth twisted pair connections 60 are not utilized, and are thus available as spare connections. Third and fourth twisted pair connections 60 are shown connected to powered device interface circuit 80 to allow operation alternatively in a manner that will be described further hereinto below in relation to FIG. 1b over unused third and fourth twisted pair connections 60. Powered device interface circuit 80 enables detection and classification in accordance with the relevant standard, preferably IEEE 802.3 af-2003. Once power is supplied by PSE 40 to power device interface circuit 80, power device interface circuit 80 operates switch 90 to enable operation of PD operating circuitry 100. DC/DC converter 110 is illustrated at the input to PD operating circuitry 100, however this is not meant to be limiting in any way. DC/DC converter 110 may be located externally of PD operating circuitry 100, within powered device interface circuit 80 or in one embodiment may not appear.

Figure 1B:
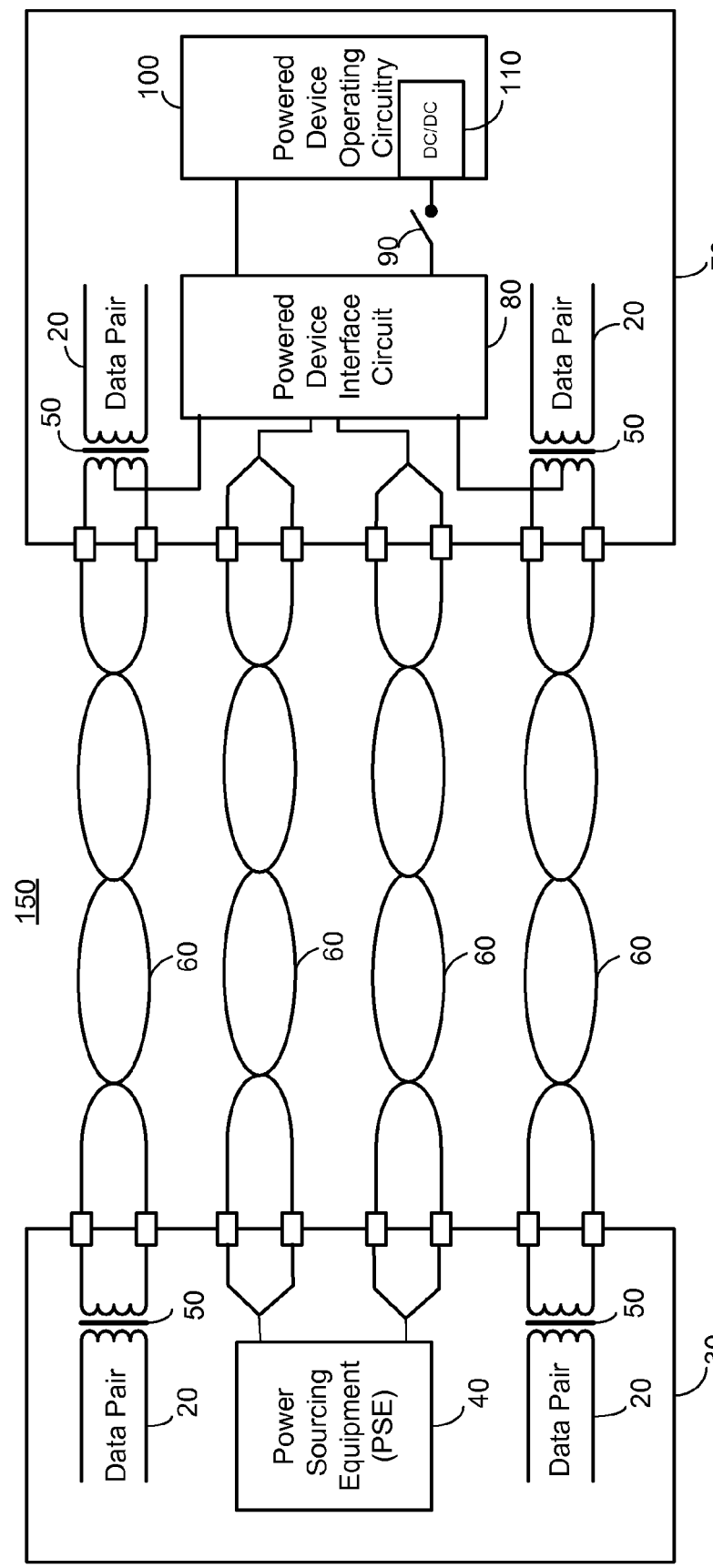
FIG. 1b illustrates a high level block diagram of a second alternative network configuration for remote powering from an endpoint PSE known to the prior art.

FIG. 1b illustrates a high level block diagram of a second alternative network configuration 150 for remote powering from an endpoint PSE known to the prior art. Network configuration 150 comprises: switch/hub equipment 30 comprising first and second data pairs 20, PSE 40 and first and second transformers 50; first, second, third and fourth twisted pair connections 60; and powered end station 70 comprising third and fourth transformers 50, third and fourth data pairs 20, powered device interface circuit 80, switch 90 and PD operating circuitry 100. PD operating circuitry 100 preferably comprises DC/DC converter 110, which typically comprises a high value input capacitor. A powered end station 70 is also denoted herein interchangeably as a PD 70.

The primary of each of first and second transformers 50 carry respective data pairs 20. The output leads of first and second transformers 50 are respectively connected to a first end of first and second twisted pair connections 60. A first output of PSE 40 is connected to both leads of third twisted pair connection 60 and a second output of PSE 40, acting as a return, is connected to both leads of fourth twisted pair connection 60. The second end of first and second twisted pair connection 60 is connected to the primary of third and fourth transformer 50, respectively, located within powered end station 70. The center tap of the primary of each of third and fourth transformer 50 is connected to respective inputs of powered device interface circuit 80. The second end of third and fourth twisted pair connections 60 are respectively connected to a first and second input of powered device interface circuit 80. A first output of powered device interface circuit 80 is connected to PD operating circuitry 100 through switch 90 at the input to DC/DC converter 110. A second output of powered device interface circuit 80 is connected to PD operating circuitry 100 as a return. The secondary of each of third and fourth transformers 50 carry third and fourth data pairs 20, respectively.

In operation PSE 60 supplies power to powered device interface circuit 80 over third and fourth twisted pair connection 60, with data being supplied over first and second twisted pair connection 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1*a*. The configurations of FIG. 1*a* and FIG. 1*b* thus allow for powering of powered end station 70 by PSE 40 either over the set of twisted pair connections 60 utilized for data communications, or over the set of twisted pair connections 60 not utilized for data communications.

Figure 1C:
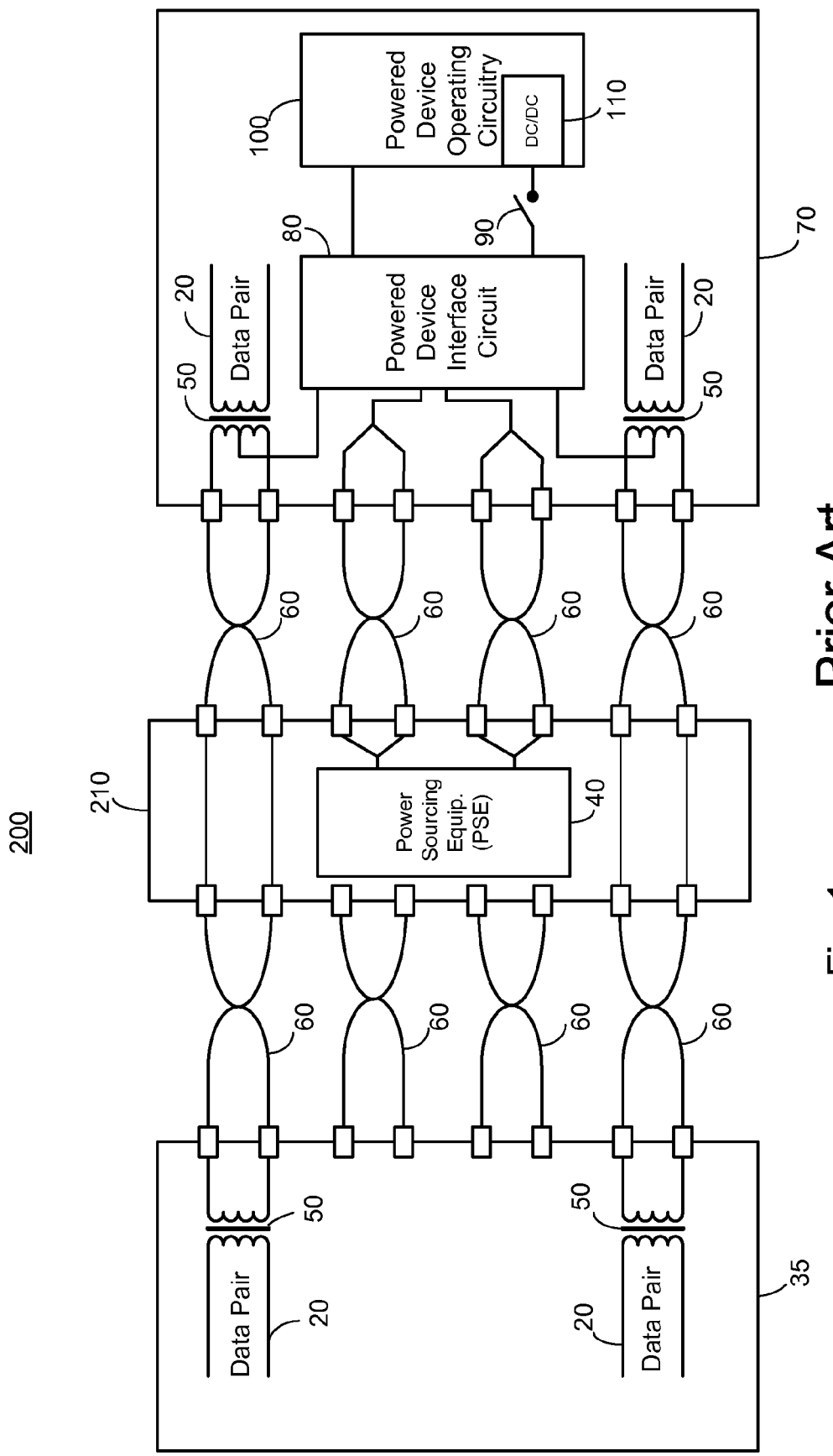
FIG. 1c illustrates a high level block diagram of an alternative network configuration for remote powering from a midspan PSE known to the prior art.

FIG. 1*c* illustrates a high level block diagram of an alternative network configuration 200 for remote powering from a midspan PSE known to the prior art. Network configuration 200 comprises: switch/hub equipment 35 comprising first and second data pairs 20 and first and second transformers 50; first through eighth twisted pair connections 60; midspan power insertion equipment 210 comprising PSE 40; powered end station 70 comprising third and fourth transformers 50, third and fourth data pairs 20, powered device interface circuit 80, switch 90 and PD operating circuitry 100. PD operating circuitry 100 preferably comprises DC/DC converter 110, which typically comprises a high value input capacitor. A powered end station 70 is also denoted herein interchangeable as a PD 70.

The primary of each of first and second transformers 50 carry respective data pairs 20. The output leads of the secondary of first and second transformers 50 are connected, respectively, to a first end of first and second twisted pair connections 60. The second end of first and second twisted pair connections 60 are connected as a straight through connection through midspan power insertion equipment 210 to a first end of fifth and sixth twisted pair connections 60, respectively. A second end of fifth and sixth twisted pair connections 60 are connected to the primary of third and fourth transformer 50, respectively, located within powered end station 70. The secondary of each of third and fourth transformers 50 carry third and fourth data pairs 20, respectively. Third and fourth twisted pair connections 60 are shown connected between switch/hub 35 and midspan power insertion equipment 210, however no internal connection to either third of fourth twisted pair connection is made.

A first output of PSE 40 is connected to both leads of one end of seventh twisted pair connection 60 and a second output of PSE 40, acting as a return, is connected to both leads of one end of eighth twisted pair connection 60. The second end of both leads of both seventh and eighth twisted pair connections 60 respectively, are connected to first and second power inputs of powered device interface unit 80. A first output of powered device interface circuit 80 is connected to PD operating circuitry 100 through switch 90 at the input to DC/DC converter 110. A second output of powered device interface circuit 80 is connected to PD operating circuitry 100 as a return. The center tap of the primary of each of third and fourth transformer 50 is connected to respective inputs of powered device interface circuit 80.

In operation PSE 40 of midspan power insertion equipment 210 supplies power to powered end station 70 over seventh and eighth twisted pair connections 60, with data being supplied from switch/hub equipment 35 over first and second twisted pair connections 60 through midspan power insertion equipment 210 to fifth and sixth twisted pair connections 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1*a*.

Figure 1D:
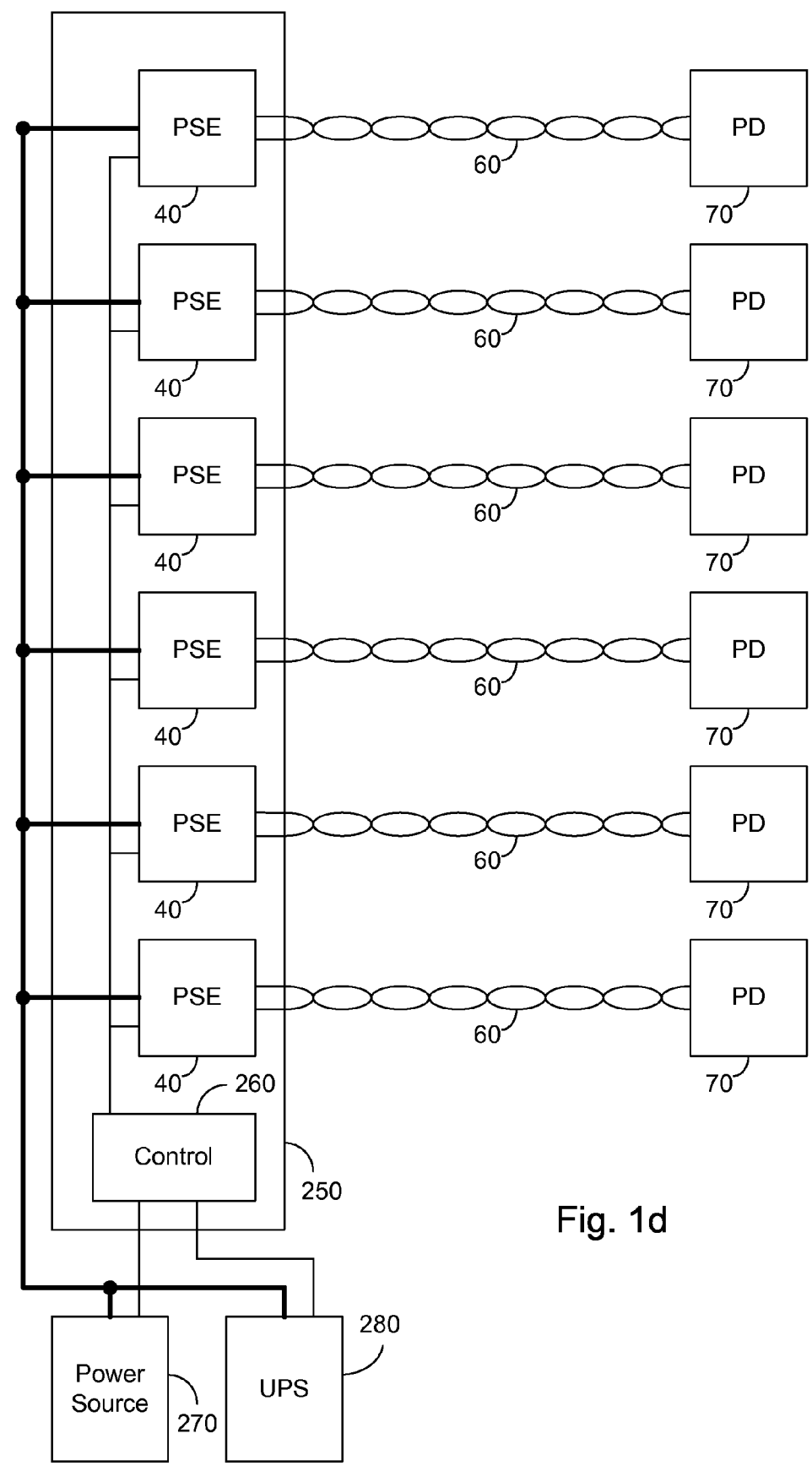
FIG. 1d illustrates a high level block diagram of a system comprising a PSE group, the PSE group comprising a plurality of PSEs receiving power from a common power source and under a single control, and each PSE arranged to power a particular PD.

FIG. 1*d* illustrates a high level block diagram of a system comprising a PSE group 250, a plurality of PDs 40, a plurality of communication cabling 60, a power source 270 and an uninterruptible power supply 280 according to the prior art. PSE group 250 comprises a plurality of PSEs 40 commonly receiving power from power source 270, and a master controller 260. Each PSE 40 is arranged to receive commands from master controller 260. Power source 270 is arranged in parallel with uninterruptible power supply 280, which thus serves as a back-up power supply in the event of a failure of power source 270. Master controller 260 receives a power indication from each of power source 270 and uninterruptible power supply 280. Each PSE 40 is connected via a particular communication cabling to a respective PD 70.

In operation, master controller 260 is operable to monitor the power available from power source 270 and uninterruptible power supply 280 and in response to allocate power to each PSE 40. Master controller 260 is further operable to read from each PSE 40 the priority associated with each PD 70, the priority being received from a settable priority indicator of the PD 70 as will be described further hereinbelow. In the event of a shortage of power, for example due to the failure of power source 270, master controller 260 is operable to disable one or more PD 70 by disabling the respective PSE 40, while maintaining priority. Thus, a PD 70 which has communicated a higher priority will be powered from the respective PSE 40 of PSE group 250, and a PD 70 which has communication a lower priority will be disabled.

Figure 2A:
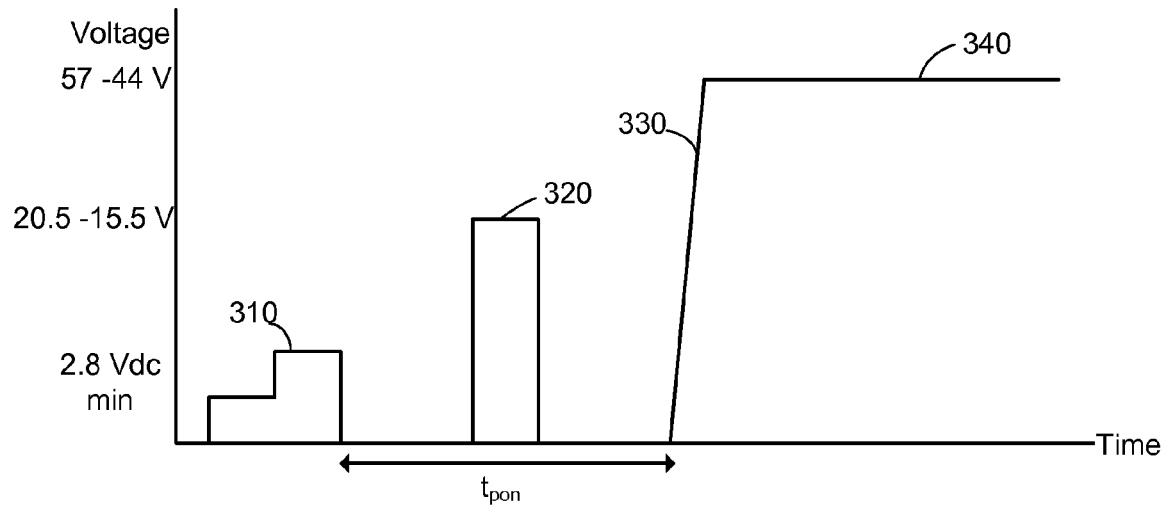
FIG. 2a illustrates detection, classification and turn on voltage timing known to the prior art.

FIG. 2*a* illustrates a plot of detection, classification and turn on voltage timing known to the prior art in which the x-axis represents time and the y-axis represents port voltage at the output of PSE 40 of FIGS. 1*a*-1*c*. Waveform 310 represents a detection voltage waveform, which in an exemplary embodiment is accomplished with 2 voltage levels having a minimum of 2.8 Volts DC and a maximum of 10.1 Volts DC. In a preferred embodiment more than 2 levels are utilized, and a pre-detection voltage is further utilized, as described in co-pending U.S. patent application Ser. No. 10/861,405 filed Jun. 7, 2004 entitled "Pre-detection of Powered Devices" whose contents are incorporated herein by reference. Waveform 310 may last up to 500 milliseconds in accordance with the aforementioned standard.

Waveform 320 represents optional classification of the powered device, and is preferably accomplished after the completion of detection and before powering of the powered device. In an exemplary embodiment, classification is accomplished by supplying a voltage of between 15.5 and 20.5 volts, for up to 75 milliseconds. After completion of the optional classification, and within time $t_{pon}$ of the completion of the detection represented by the end of waveform 310, operative current limited voltage is to be supplied to the powered device. In an exemplary embodiment, time $t_{pon}$ is less than or equal to 400 milliseconds. Waveform 330 represents the voltage rise as the above mentioned current limited voltage is supplied to the powered device. Waveform 340 represents the steady state operating condition, in which a current limited output having a voltage of between 44 and 57 volts DC is supplied by PSE 40. It is to be noted that at the PD a voltage, designated $V_{on}$, is detected as a result.

Figure 2B:
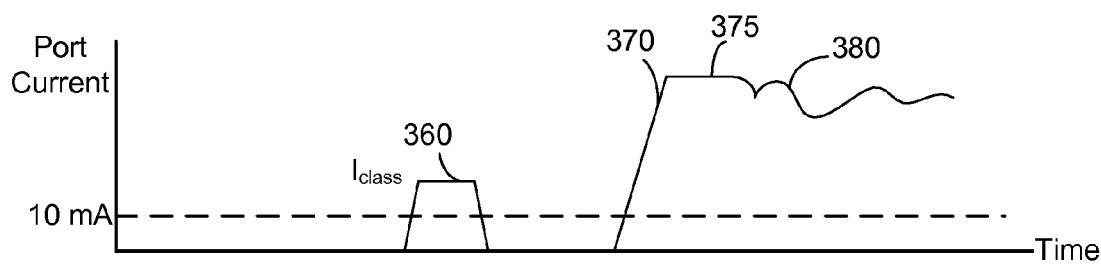
FIG. 2b illustrates classification and turn on current timing known to the prior art.

FIG. 2*b* illustrates classification and turn on current timing known to the prior art, in which the x-axis represents time and the y-axis represents port current. Waveform 360 represents optional classification current, and is associated with optional classification voltage waveform 320 of FIG. 2*a*. Waveform 370 represents current sourced to the powered end station 70, and is associated with current limited voltage waveform 330 of FIG. 2*a*. Waveform 370 is shown rising in a linear fashion, following which waveform 375 shows current limited charging of the high value input capacitance of DC/DC converter 110. After charging of the high value input capacitance, waveform 380 represents the port current fluctuations typically associated with current flow to the input of DC/DC converter 110 of PD operating circuitry 100 of FIGS. 1a-1c. Waveforms 375 and 380 are associated with current limited voltage waveform 340 of FIG. 2a. The shapes of waveforms 370, 375 and 380 are not meant to be limiting in any way, and the operating current waveforms 370 and 380 may exhibit any shape without exceeding the scope of the invention. Preferably, the current as represented by waveform 375 and 380 remains with the confines of the requirements of the applicable standard to prevent PSE 40 from removing power due to the absence of a valid maintain power signature (MPS) component or due to an excessive current draw. In an exemplary embodiment the current as depicted by waveforms 375 and 380 meets or exceeds 10 mA for at least 60 ms of every 300 ms period thus presenting a valid DC-MPS component.

Figure 3A:
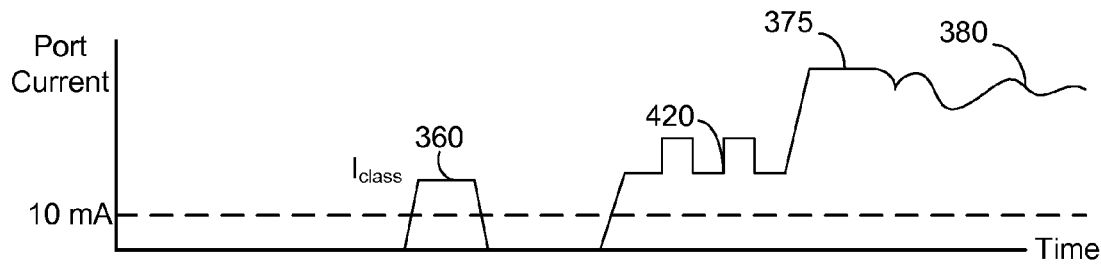
FIG. 3a illustrates timing of classification, communication and turn on current of a first embodiment exhibiting two levels in accordance with a principle of the current invention.

FIG. 3a illustrates timing of classification, communication and turn on current of a first embodiment exhibiting two levels of current in accordance with a principle of the current invention in which the x-axis represents time and the y-axis represents port current. Waveform 360 represents optional classification current, and is associated with optional classification voltage waveform 320 of FIG. 2a. Waveform 420 represents data communication from powered device interface circuit 80 to PSE 40 via 2 current levels. It is to be noted that the 2 current levels are herein illustrated as being above 10 mA, thus ensuring a valid DC-MPS component, however this is not meant to be limiting in any way. One of the current levels may be less than 10 mA, zero, or negative without exceeding the scope of the invention. In an exemplary embodiment communication as represented by waveform 420 is of a duration less than 300 ms, thus a valid DC-MPS component is ensured by valid powered device circuitry having a power draw in excess of 10 mA. Waveform 420 is associated with voltage waveform 340 of FIG. 2a, and is representative of current based communication after voltage at the PD supplied from PSE 40 rises to $V_{on}$. PSE 40 is operational to detect the current fluctuation and thereby receive the communication from powered device interface circuit 80.

Data communication from powered device interface circuit 80 to PSE 40 is illustrated as being in a unilateral direction, however this is not meant to be limiting in any way. PSE 40 may also communicate with data interface circuit 80 without exceeding the scope of the invention. Preferably, powered device interface circuit 80 communicates with PSE 40 prior to closing switch 90, thus DC/DC converter 110 is not powered and its associated noise and high value input capacitance, as describe above in relation to waveforms 375 and 380 of FIG. 2b, is absent. It is to be understood that this requires powered device interface circuit 80 to sink any current and thus minimizing current flow during the communication period as illustrated by waveform 420 is desirable.

After completion of communication as illustrated by waveform 420, operating current is supplied to DC/DC converter 110 by closing switch 90 thereby supplying power to PD operating circuitry 100 as illustrated by waveforms 375 and 380. Waveforms 375 and 380 are in all respects similar to waveforms 375 and 380 of FIG. 2b, and illustrate typical operating current flows.

Figure 3B:
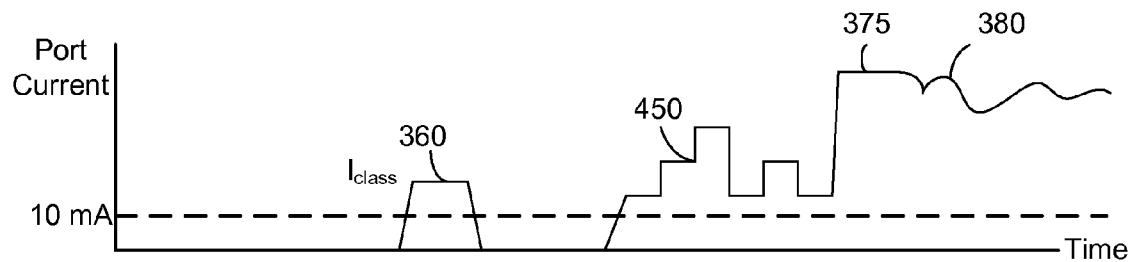
FIG. 3b illustrates timing of classification, communication and turn on current of a first embodiment exhibiting three levels in accordance with a principle of the current invention.

FIG. 3b illustrates timing of classification, communication and turn on current of a first embodiment exhibiting three levels in accordance with a principle of the current invention, in which the x-axis represents time and the y-axis represents port current. Waveform 360 represents optional classification current, and is associated with optional classification voltage waveform 320 of FIG. 2a. Waveform 450 represents data communication from powered device interface circuit 80 to PSE 40 via a plurality of current levels, of which 3 current levels are illustrated. It is to be noted that the 3 current levels are herein illustrated as each being above 10 mA, thus ensuring a valid DC-MPS component, however this is not meant to be limiting in any way. One or more of the current levels may be less than 10 mA, zero, or negative without exceeding the scope of the invention. In an exemplary embodiment communication as represented by waveform 450 is of a duration less than 300 ms, thus a valid DC-MPS component is ensured by valid powered device circuitry having a power draw in excess of 10 mA. Waveform 450 is associated with voltage waveform 340 of FIG. 2a, and is representative of current based communication after voltage at the PD supplied from PSE 40 rises to $V_{on}$. PSE 40 is operational to detect the current fluctuation and thereby receive the communication from powered device interface circuit 80.

Data communication from powered device interface circuit 80 to PSE 40 is illustrated as being in a unilateral direction, however this is not meant to be limiting in any way. PSE 40 may also communicate with data interface circuit 80 without exceeding the scope of the invention. Preferably, powered device interface circuit 80 communicates with PSE 40 prior to closing switch 90, thus DC/DC converter 110 is not powered and its associated noise and high value input capacitance as describe above in relation to waveforms 375 and 380 of FIG. 2b, is absent. It is to be understood that this requires powered device interface circuit 80 to sink any current and thus minimizing current flow during the communication period as illustrated by waveform 450 is desirable.

After completion of communication as illustrated by waveform 450, operating current is supplied to DC/DC converter 110 by closing switch 90 thereby supplying power to PD operating circuitry 100 as illustrated by waveforms 375 and 380. Waveforms 375 and 380 are in all respects similar to waveforms 375 and 380 of FIG. 2b, and illustrate typical operating current flows.

Figure 4A:
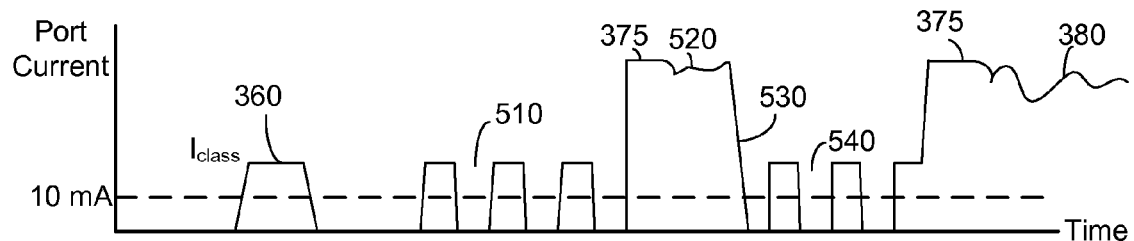
FIG. 4a illustrates timing of classification, communication and turn on current of a second embodiment exhibiting two levels in accordance with a principle of the current invention.

FIG. 4a illustrates timing of classification, communication and turn on current of a second embodiment exhibiting two levels in accordance with a principle of the current invention, in which the x-axis represents time and the y-axis represents port current. Waveform 360 represents optional classification current, and is associated with optional classification voltage waveform 320 of FIG. 2a. Waveform 510 represents data communication from powered device interface circuit 80 to PSE 40 via a plurality of current levels, of which 2 current levels are illustrated. It is to be noted that a first one of the 2 current levels is illustrated as being below 10 mA, illustrated as zero current, with the second one of the 2 current levels being above 10 mA, illustrated as being 20 mA, however this is not meant to be limiting in any way. Preferably the timing and average current of waveform 510 ensures a valid DC-MPS component. In an exemplary embodiment communication as represented by waveform 510 is of a short duration, less than 300 ms and typically on the order of 100 ms, thus a valid DC-MPS component is ensured by valid powered device circuitry having a power draw in excess of 10 mA after completion of communication. Waveform 510 is associated with voltage waveform 340 of FIG. 2a, and is representative of current based communication after voltage at the PD supplied from PSE 40 rises to $V_{on}$. PSE 40 is operational to detect the current fluctuation and thereby receive the communication from powered device interface circuit 80. In the exemplary embodiment shown, PSE 40 is operational to detect communication as current levels above and below a predetermined threshold.

Data communication from powered device interface circuit 80 to PSE 40 is illustrated as being in a unilateral direction, however this is not meant to be limiting in any way. PSE 40 may also communicate with data interface circuit 80 without exceeding the scope of the invention. Preferably, powered device interface circuit 80 communicates with PSE 40 prior to closing switch 90, thus DC/DC converter 110 is not powered and its associated noise and high value input capacitance, as describe above in relation to waveforms 375 and 380 of FIG. 2b, is absent. It is to be understood that this requires powered device interface circuit 80 to sink any current and thus minimizing current flow during the communication period as illustrated by waveform 510 is desirable.

After completion of communication as illustrated by waveform 510, operating current is supplied to DC/DC converter 110 by closing switch 90 thereby supplying power to PD operating circuitry 100 as illustrated by waveforms 375 and 520. Waveform 375 is in all respects similar to waveforms 375 of FIG. 2b. Waveform 520 is in all respects similar to waveform 380 of FIG. 2b, and illustrates typical operating current flows. After a start up period illustrated by the time duration of waveform 520, switch 90 is opened as illustrated by waveform end 530 of waveform 520. Thus, operating current is disconnected from DC/DC converter 110, and the attendant noise and high value input capacitance is removed. Waveform end 530 is shown falling to a level equivalent to that of the first current level of waveform 510, however this is not meant to be limiting in any way. Waveform 530 may be reduced to a higher or lower level than the first current level of waveform 510 without exceeding the scope of the invention. Preferably, waveform 530 arrives at a stable operating level prior to further communication.

Waveform 540 represents data communication from powered device interface circuit 80 to PSE 40 via a plurality of current levels, of which 2 current levels are illustrated. Preferably communication begins after waveform 530 has achieved a quiescent stable operation level. It is to be noted that a first one of the 2 current levels is illustrated as being below 10 mA, illustrated as zero current, with the second one of the 2 current levels being above 10 mA, illustrated as being 20 mA, however this is not meant to be limiting in any way. Preferably the timing and average current of waveform 540 ensures a valid DC-MPS component. In an exemplary embodiment communication as represented by waveform 540 is of a short duration, less than 300 ms and typically on the order of 100 ms, thus a valid DC-MPS component is ensured by valid powered device circuitry having a power draw in excess of 10 mA after completion of communication. In the exemplary embodiment shown, PSE 40 is operational to detect communication as current levels above and below a pre-determined threshold. In a further exemplary embodiment the pre-determined threshold is 15 mA.

Data communication from powered device interface circuit 80 to PSE 40 is illustrated during waveform 540 as being in a unilateral direction, however this is not meant to be limiting in any way. PSE 40 may also communicate with data interface circuit 80 without exceeding the scope of the invention. It is to be understood that powered device interface circuit 80 sinks any current and thus minimizing current flow during the communication period as illustrated by waveform 540 is desirable.

After completion of communication as illustrated by waveform 540, operating current is again supplied to DC/DC converter 110 by closing switch 90 thereby supplying power to PD operating circuitry 100 as illustrated by waveforms 375 and 380. Waveforms 375 and 380 are is in all respects similar to waveforms 375 and 380 of FIG. 2b, and illustrates typical operating current flows.

Figure 4B:
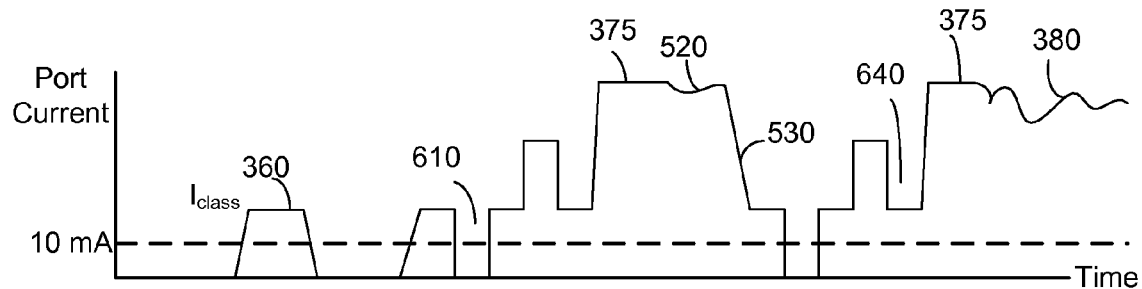
FIG. 4b illustrates timing of classification, communication and turn on current of a second embodiment exhibiting three levels in accordance with a principle of the current invention.

FIG. 4b illustrates timing of classification, communication and turn on current of a second embodiment exhibiting three levels in accordance with a principle of the current invention, in which the x-axis represents time and the y-axis represents port current. Waveform 360 represents optional classification current, and is associated with optional classification voltage waveform 320 of FIG. 2a. Waveform 610 represents data communication from powered device interface circuit 80 to PSE 40 via a plurality of current levels, of which 3 current levels are illustrated. It is to be noted that one of the 3 current levels is illustrated as being zero, with the other 2 current levels being above 10 mA, thus ensuring a valid DC-MPS component, however this is not meant to be limiting in any way. Any one or more of the current levels may be less than 10 mA, zero, or negative without exceeding the scope of the invention. Preferably the timing and average current of waveform 610 ensures a valid DC-MPS component. In an exemplary embodiment communication as represented by waveform 610 is of a duration less than 300 ms, thus a valid DC-MPS component is ensured by valid powered device circuitry having a power draw in excess of 10 mA after communication. Waveform 610 is associated with voltage waveform 340 of FIG. 2a, and is representative of current based communication after voltage at the PD supplied from PSE 40 rises to $V_{on}$. In the exemplary embodiment shown, PSE 40 is operational to detect communication at the plurality of current levels.

Data communication from powered device interface circuit 80 to PSE 40 is illustrated as being in a unilateral direction, however this is not meant to be limiting in any way. PSE 40 may also communicate with data interface circuit 80 without exceeding the scope of the invention. Preferably, powered device interface circuit 80 communicates with PSE 40 prior to closing switch 90, thus DC/DC converter 110 is not powered and its associated noise and high value input capacitance, as describe above in relation to waveforms 375 and 380 of FIG. 2b, is absent. It is to be understood that this requires powered device interface circuit 80 to sink any current and thus minimizing current flow during the communication period as illustrated by waveform 610 is desirable.

After completion of communication as illustrated by waveform 610, operating current is supplied to DC/DC converter 110 by closing switch 90 thereby supplying power to PD operating circuitry 100 as illustrated by first waveform 375. First waveform 375 is in all respects similar to waveform 375 of FIG. 2b and waveform 520 is in all respects similar to waveform 380 of FIG. 2. After a start up period illustrated by the time duration of waveform 520, switch 90 is opened as illustrated by waveform end 530 of waveform 520. Thus, operating current is disconnected from DC/DC converter 110, and the attendant noise and high value input capacitance is removed. Waveform end 530 is shown falling to a level equivalent to that of the first current level of waveform 610, however this is not meant to be limiting in any way. Waveform 530 may be reduced to a higher or lower level than the first current level of waveform 610 without exceeding the scope of the invention. Preferably, waveform 530 arrives at a stable operating level prior to further communication.

Waveform 640 represents data communication from powered device interface circuit 80 to PSE 40 via a plurality of current levels, of which 3 current levels are illustrated. Preferably communication begins after waveform end 530 has achieved a quiescent stable operation level. It is to be noted that one of the plurality of current levels is illustrated as being zero, with the other 2 current levels being above 10 mA, thus ensuring a valid DC-MPS component, however this is not meant to be limiting in any way. Any one or more of the current levels may be less than 10 mA, zero, or negative without exceeding the scope of the invention. Preferably the timing and average current of waveform 640 ensures a valid DC-MPS component. In an exemplary embodiment communication as represented by waveform 640 is of a duration less than 300 ms, thus a valid DC-MPS component is ensured by valid powered device circuitry having a power draw in excess of 10 mA. In the exemplary embodiment shown, PSE 40 is operational to detect communication at the plurality of current levels.

Data communication from powered device interface circuit 80 to PSE 40 is illustrated during waveform 640 as being in a unilateral direction, however this is not meant to be limiting in any way. PSE 40 may also communicate with data interface circuit 80 without exceeding the scope of the invention. It is to be understood that powered device interface circuit 80 sinks any current and thus minimizing current flow during the communication period as illustrated by waveform 640 is desirable.

After completion of communication as illustrated by waveform 640, operating current is again supplied to DC/DC converter 110 by closing switch 90 thereby supplying power to PD operating circuitry 100 as illustrated by second waveform 375 and waveform 380. Second waveform 375 and waveform 380 are in all respects similar to waveforms 375 and 380 of FIG. 2b, and illustrate typical operating current flows.

Figure 5A:
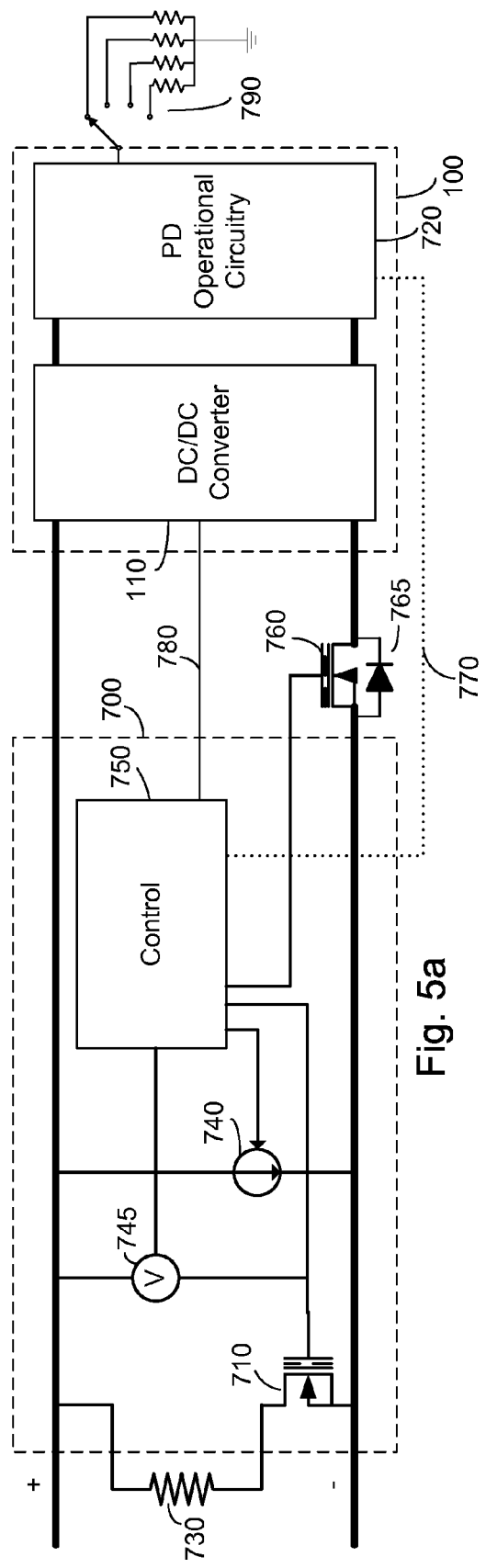
FIG. 5a illustrates a high level block diagram of a first embodiment of a powered device in accordance with the principle of the current invention exhibiting an interface circuit, switch and associated powered device operating circuitry.

FIG. 5a illustrates a high level block diagram of a first embodiment of a powered device in accordance with the principle of the current invention exhibiting a PD interface circuitry 700, a switch 760, a settable priority indicator 790 and an associated PD operating circuitry 100. PD interface circuitry 700 comprises: a switch 710 illustrated as a FET switch; a signature impedance 730; a controllable current source 740; a voltage sensor 745; a control circuit 750; and a positive and negative power lead. Switch 90 of FIGS. 1a-1c is illustrated as an N-MOS FET switch 760 exhibiting parasitic diode 765, however this is not meant to be limiting in any way, and switch 760 may be any electronically controlled switch. PD operating circuitry 100 comprises a DC/DC converter 110 and a PD operational circuitry 720. A positive power lead and a negative power lead are shown; the positive and negative power leads being operatively connected over communication cabling 60 to PSE 40 (not shown) as described above in relation to FIGS. 1a-1c. In an exemplary embodiment polarity is ensured through the use of diode bridges. PD operational circuitry 720 is also known as host circuitry.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connected to control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits an optional power good signal 780, connected to DC/DC converter 110.

Settable priority indicator 790 is connected to PD operational circuitry 720, and is illustrated as a switch, the arm of which is connected to a port of PD operational circuitry 720 and whose posts are connected through one of a plurality of resistors of non-equal value to ground. Thus, PD operational circuitry 720 is operable to detect the state of settable priority indicator 790 by measuring the resistance to ground. Settable priority indicator 790 is illustrated as a switch with a plurality of non-equal resistances, however this is not meant to be limiting in any way. In another embodiment settable priority indicator 790 comprises a switch whose posts are connected to ports of PD operational circuitry 720 and whose arm is connected to a constant voltage point, such as ground. In yet another embodiment, settable priority indicator 790 comprises a software program run on PD operational circuitry 720. In yet another embodiment settable priority indicator 790 may be a factory set firmware code store in PD operational circuitry 790. Settable priority indicator 790 thus may be any combination of hardware and software, functional to indicate a priority level indication to PD operational circuitry 720. Settable priority indicator 790 may be settable by a user, authorized installation personnel, or a factory set up without exceeding the scope of the invention. Settable priority indicator 790 is illustrated as being connected to PD operational circuitry 720, however this is not meant to be limiting in any way. In another embodiment settable priority indicator 790 is connected to control circuit 750 without exceeding the scope of the invention.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during operation of PD operational circuitry 720. During the optional classification phase described above in relation to FIGS. 2a-4b, control circuit 750 operates controllable current source 740 to exhibit a pre-determined current to PSE 40 across the positive and negative power leads. After completion of the classification phase, control circuit 750 turns off controllable current source 740.

Control circuit 750 senses operating voltage exceeding $V_{on}$ via voltage sensor 745, and operates controllable current source 740 to generate a plurality of current levels as illustrated by waveforms 510 and 540 of FIG. 4a, thus enabling communication. Thus, a single controllable current source is used for both classification and communication. In the embodiment (not shown) in which settable priority indicator 790 is connected to control circuit 750, communication preferably comprises data corresponding to the priority level indicated by settable priority indicator 790.

Operating current is provided to DC/DC converter 110 by control circuit 750 closing switch 760. Power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720 data, comprising data corresponding to the priority level indicated by settable priority indicator 790, is provided from PD operational circuitry 720 to control circuit 750 via optional data path 770. The information provided to control circuit 750 from PD operational circuitry 720 is transmitted to PSE 40 as illustrated by waveforms 540, 640 of FIGS. 4a, 4b. In an exemplary embodiment optional power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables optional power good signal 780 after discharge of the input capacitance of DC/DC converter 110. In another embodiment, optional power good signal 780 is maintained for a fixed time period. The term opening of the switch is meant to include any state of the switch in which there is no appreciable current flow.

Figure 5B:
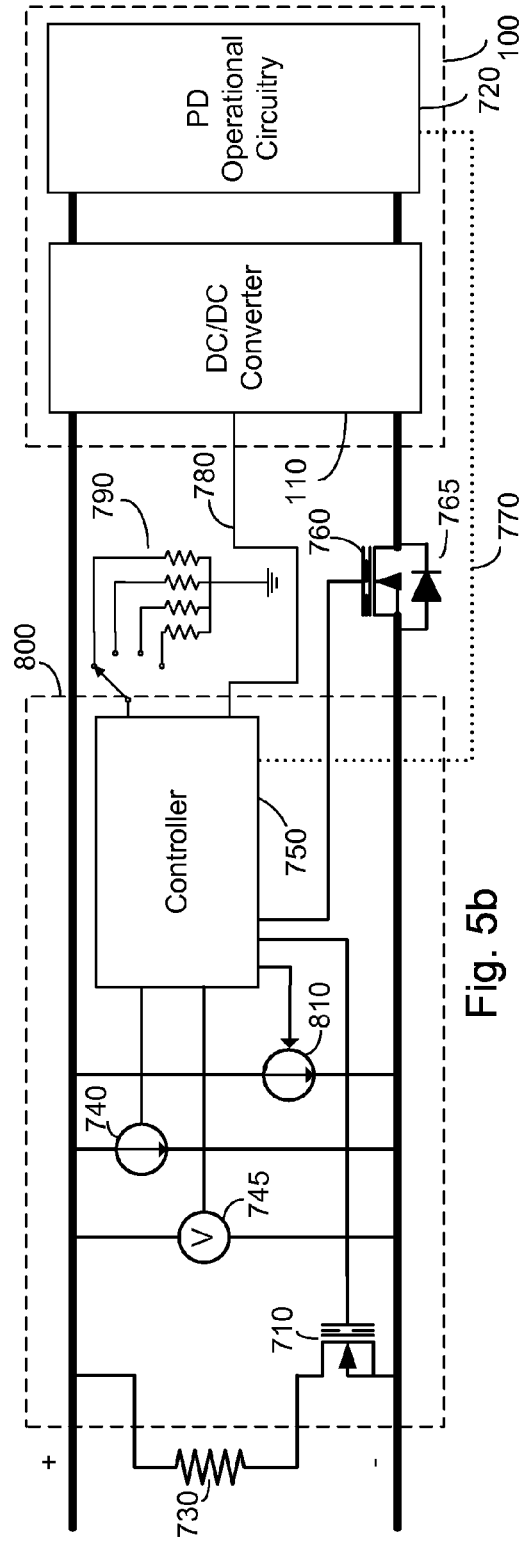
FIG. 5b illustrates a high level block diagram of a second embodiment of a powered device in accordance with the principle of the current invention exhibiting an interface circuit, switch and associated powered device operating circuitry.

FIG. 5b illustrates a high level block diagram of a second embodiment of a powered device in accordance with the principle of the current invention comprising a PD interface circuitry 800, a switch 760, a settable priority indicator 790 and an associated PD operating circuitry 100. PD interface circuitry 800 comprises: a switch 710 illustrated as a FET switch; a signature impedance 730; a controllable current source 740; a voltage sensor 745; a variable current source 810; a control circuit 750 and a positive and negative power lead. Switch 90 of FIGS. 1a-1c is illustrated as N-MOS FET switch 760 exhibiting parasitic capacitance 765, however this is not meant to be limiting in any way, and switch 760 may be any electronically controlled switch. PD operating circuitry 100 comprises a DC/DC converter 110 and a PD operational circuitry 720. A positive power lead and a negative power lead are shown; the positive and negative power leads being operatively connected over communication cabling 60 to PSE 40 (not shown) as described above in relation to FIGS. 1a-1c. In an exemplary embodiment polarity is ensured through the use of diode bridges.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connected to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits an optional power good signal 780, connected to DC/DC converter 110.

Settable priority indicator 790 is connected to control circuit 750, and is illustrated as a switch, the arm of which is connected to a port of control circuit 750 and whose posts are connected through one of a plurality of resistors of non-equal value to ground. Thus, control circuit 750 is operable to detect the state of settable priority indicator 790 by measuring the resistance to ground. Settable priority indicator 790 is illustrated as a switch with a plurality of non-equal resistances, however this is not meant to be limiting in any way. In another embodiment settable priority indicator 790 comprises a switch whose posts are connected to ports of control circuit 750 and whose arm is connected to a constant voltage point, such as ground. In yet another embodiment, settable priority indicator 790 comprises a software program run on control circuit 750. In yet another embodiment settable priority indicator 790 may be a factory set firmware code stored in control circuit 750. Settable priority indicator 790 thus may be any combination of hardware and software, functional to indicate a priority level indication to control circuit 750. Settable priority indicator 790 may be settable by a user, authorized installation personnel, or a factory set up without exceeding the scope of the invention. Settable priority indicator 790 is illustrated as being connected to control circuit 750, however this is not meant to be limiting in any way. In another embodiment (not shown) settable priority indicator 790 is connected to PD operational circuitry 720 without exceeding the scope of the invention.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a-4b, control circuit 750 operates controllable current source 740 to generate the appropriate classification current, typically selectable by an external resistor (not shown).

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a-4b. Variable current source 810 may provide any number of levels of current. Communication preferably comprises data corresponding to the priority level indicated by settable priority indicator 790.

Operating current to DC/DC converter 110 is provided by control circuit 750 closing switch 760. Optional power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720 data is provided from PD operational circuitry 720 to control circuit 750 via optional data path 770. In the embodiment (not shown) in which settable priority indicator 790 is connected to PD operational circuitry 720, data comprises the priority level indicated by settable priority indicator 790. The information provided to control circuit 750 from PD operational circuitry 720 is transmitted to PSE 40 as illustrated by waveforms 540, 640 of FIGS. 4a, 4b. In an exemplary embodiment optional power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables optional power good signal 780 after discharge of the input capacitance of DC/DC converter 110. In another embodiment, optional power good signal 780 is maintained for a fixed time period.

FIG. 5c illustrates a high level block diagram of a third embodiment of a powered device in accordance with the principle of the current invention comprising PD interface circuitry 900, a switch 760, a settable priority indicator 790 and an associated PD operating circuitry 100. PD interface circuitry 900 comprises: a switch 710 illustrated as a FET switch; a signature impedance 730; a controllable current source 740; a voltage sensor 745; a variable impedance 910; a control circuit 750; and a positive and negative power lead. Switch 90 of FIGS. 1a-1c is illustrated as N-MOS FET switch 760 exhibiting parasitic capacitance 765, however this is not meant to be limiting in any way, and switch 760 may be any electronically controlled switch. PD operating circuitry 100 comprises a DC/DC converter 110 and a PD operational circuitry 720. A positive power lead and a negative power lead are shown; the positive and negative power leads being operatively connected over communication cabling 60 to PSE 40 (not shown) as described above in relation to FIGS. 1a-1c. In an exemplary embodiment polarity is ensured through the use of diode bridges.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connected to control circuit 750. Variable impedance 910 is connected across the positive and negative power leads, and the control input of variable impedance 910 is connected to an output of control circuit 750. Switch 760 is connected to enable connection by control circuit 750 of the negative power lead to the negative power input of DC/DC converter 110. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits an optional power good signal 780, connected to DC/DC converter 110.

Settable priority indicator 790 is connected to control circuit 750, and is illustrated as a switch, the arm of which is connected to a port of control circuit 750 and whose posts are connected through one of a plurality of resistors of non-equal value to ground. Thus, control circuit 750 is operable to detect the state of settable priority indicator 790 by measuring the resistance to ground. Settable priority indicator 790 is illustrated as a switch with a plurality of non-equal resistances, however this is not meant to be limiting in any way. In another embodiment settable priority indicator 790 comprises a switch whose posts are connected to ports of control circuit 750 and whose arm is connected to a constant voltage point, such as ground. In yet another embodiment, settable priority indicator 790 comprises a software program run on control circuit 750. In yet another embodiment settable priority indicator 790 may be a factory set firmware code stored in control circuit 750. Settable priority indicator 790 thus may be any combination of hardware and software, functional to indicate a priority level indication to control circuit 750. Settable priority indicator 790 may be settable by a user, authorized installation personnel, or a factory set up without exceeding the scope of the invention. Settable priority indicator 790 is illustrated as being connected to control circuit 750, however this is not meant to be limiting in any way. In another embodiment (not shown) settable priority indicator 790 is connected to PD operational circuitry 720 without exceeding the scope of the invention.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a-4b, control circuit 750 operates controllable current source 740 to generate the appropriate classification current.

Control circuit 750 senses operating voltage exceeding $V_{on}$ via voltage sensor 745, and operates variable impedance 910 to generate a plurality of current levels in cooperation with power being supplied by PSE 40, thus enabling communication as illustrated by respective waveforms 420, 450, 510, 540, 610 and 640 of FIGS. 3a-4b. Variable impedance 910 may provide any number of levels of current. Communication preferably comprises data corresponding to the priority level indicated by settable priority indicator 790.

Operating current is provided to DC/DC converter 110 by control circuit 750 closing switch 760. Optional power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720, data is provided from PD operational circuitry 720 to control circuit 750 via optional data path 770. In the embodiment (not shown) in which settable priority indicator 790 is connected to PD operational circuitry 720, data comprises the priority level indicated by settable priority indicator 790. The information provided to control circuit 750 from PD operational circuitry 720 is transmitted to PSE 40 as illustrated by waveforms 540, 640 of FIGS. 4a, 4b. In an exemplary embodiment optional power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables optional power good signal 780 after discharge of the input capacitance of DC/DC converter 110. In another embodiment, optional power good signal 780 is maintained for a fixed time period.

FIG. 5d illustrates a high level block diagram of a fourth embodiment of a powered device in accordance with the principle of the current invention comprising a PD interface circuitry 950 comprising a switch 760, and an associated PD operating circuitry 100. PD interface circuitry 950 comprises: a switch 710 illustrated as a FET switch; a controllable current source 740; a voltage sensor 745; a variable current source 810; a control circuit 750; a switch 760 illustrated as an N-MOS FET switch exhibiting parasitic capacitance 765; and a PWM or resonance controller 960. A signature impedance 730 and a classification resistor 755 are externally connected to powered device interface circuit 950. Switch 90 of FIGS. 1a-1c is illustrated as internal FET switch 760, however this is not meant to be limiting in any way, and FET switch 760 may be any electronically controlled switch. A positive power lead and a negative power lead are shown; the positive and negative power leads being operatively connected over communication cabling 60 to PSE 40 (not shown) as described above in relation to FIGS. 1a-1c. In an exemplary embodiment polarity is ensured through the use of diode bridges.

PD operating circuitry 100 comprises: a DC/DC converter 110; a PD operational circuitry 720; and a settable priority indicator 790. DC/DC converter 110 comprises: a input capacitor 962; a switch 964 illustrated as a FET switch; a sense resistance 967; a fly-back transformer 966; a diode 968; an output capacitor 970; and a plurality of feedback resistors 972 and 974. Switch 964 is illustrated as a FET switch however this is not meant to be limiting in any way, and switch 964 may be any electronically controlled switch. It is to be noted that PWM or resonance controller 960 is normally part of DC/DC converter 110, and in this implementation has been placed within powered device interface circuit 950.

Settable priority indicator 790 is connected to PD operational circuitry 720, and is illustrated as a switch, the arm of which is connected to a port of PD operational circuitry 720 and whose posts are connected through one of a plurality of resistors on non-equal value to ground. Thus, PD operational circuitry 720 is operable to detect the state of settable priority indicator 790 by measuring the resistance to ground. Settable priority indicator 790 is illustrated as a switch with a plurality of non-equal resistances, however this is not meant to be limiting in any way. In another embodiment settable priority indicator 790 comprises a switch whose posts are connected to ports of PD operational circuitry 720 and whose arm is connected to a constant voltage point, such as ground. In yet another embodiment, settable priority indicator 790 comprises a software program run on PD operational circuitry 720. In yet another embodiment settable priority indicator 790 may be a factory set firmware code store in PD operational circuitry 790. Settable priority indicator 790 thus may be any combination of hardware and software, functional to indicate a priority level indication to PD operational circuitry 720. Settable priority indicator 790 may be settable by a user, authorized installation personnel, or a factory set up without exceeding the scope of the invention. Settable priority indicator 790 is illustrated as being connected to PD operational circuitry 720, however this is not meant to be limiting in any way. In another embodiment settable priority indicator 790 is connected to control circuit 750 without exceeding the scope of the invention.

Switch 710 is connected to enable the presentation of signature impedance 730 across the positive and negative power leads by control circuit 750. Controllable current source 740 is connected across the positive and negative power leads, and is operable by control circuit 750. The value of the current transmitted by controllable current source 740 is a function of classification resistor 755. Voltage sensor 745 is connected across the positive and negative power leads and the output of voltage sensor 745 is connected to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits a communication path 980 to PWM or resonance controller 960.

DC/DC converter 110 is illustrated as being a non-isolated fly-back topology, however this is not meant to be limiting in any way. Other topologies, including, but not limited to, forward, push-pull and bridge are specifically meant to be included without exceeding the scope of the invention. Each of the above topologies may be supplied either isolated or non-isolated without exceeding the scope of the invention. Input capacitor 962, which in an exemplary embodiment comprises an electrolytic capacitor valued between 47 μf and 470 μf, is connected across the positive and negative power leads at the input of DC/DC converter 110. The primary of fly-back transformer 966 is connected through switch 964 and sense resistance 967 across the negative and positive power leads. Switch 964 is operatively connected to an output of PWM or resonance controller 960. The voltage generated across sense resistance 967 is connected as an input to PWM or resonance controller 960. The secondary of fly-back transformer 966 is connected through diode 968 as the power input to PD operational circuitry 720. Output capacitor 970 is connected across the output of DC/DC converter 110. Feedback resistors 972 and 974 form a voltage divider across the output of DC/DC converter 110, and the divided output is connected to an input of PWM or resonance controller 960. In the event that an isolated topology is utilized, the divided output from feedback resistors 972 and 974 is fed through an appropriate isolator to an input of PWM or resonance controller 960.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a-4b, control circuit 750 operates controllable current source 740 to present the appropriate classification current across the positive and negative power leads.

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a-4b. Variable current source 810 may provide any number of levels of current. In the embodiment (not shown) in which settable priority indicator 790 is connected to control circuit 750, communication preferably comprises data corresponding to the priority level indicated by settable priority indicator 790.

Operating current is provided to DC/DC converter 110 by control circuit 750 closing switch 760. Control circuit 750 enables PWM or resonance controller 960 via communication path 980. PWM or resonance controller 960 pulses switch 964 to generate an appropriate voltage output of DC/DC converter 110 to be fed to PD operational circuitry 720. Advantageously, communication path 980 is bi-directional, thus PWM or resonance controller 960 which acts as a portion of DC/DC converter 110 is in communication with control circuit 750.

Communication of data from PD operational circuitry 720 to control circuit 750 is provided by optional data path 770. In one embodiment optional data path 770 is provided with isolation. As will be described further hereinto below, and preferably in relation to the second embodiment illustrated above in relation to FIGS. 4a and 4b, after start up of PD operational circuitry 720 data, comprising data corresponding to the priority level indicated by settable priority indicator 790, is provided from PD operational circuitry 720 to control circuit 750 via optional data path 770. The information provided to control circuit 750 from PD operational circuitry 720 is transmitted to PSE 40 as illustrated by waveforms 540 640 of FIGS. 4a, 4b.

It is to be noted that during shut off of FET switch 760 a parasitic path for discharge of input capacitor 962 is present through parasitic diode 765. Preferably, control circuit 750 maintains the operation of PWM or resonance controller 960 via communication path 980 after opening FET switch 760 so as discharge input capacitor 962. In particular, control circuit 750 operates PWM or resonance controller 960 despite the shut off of FET switch 760, and preferably maintains operation of PWM or resonance controller 960 as long as is practicable. Voltage sense inputs of PWM or resonance controller 960 are in one embodiment transmitted to control circuit 750 via communication path 980 thus enabling control circuit 750 to maintain the operation of PWM or resonance controller 960 only until discharge of capacitor 960. Advantageously, in the event of a loss of power from PSE 40, the operation of PWM or resonance controller 960 is maintained after opening switch 760, thus discharging input capacitor 962. Discharging input capacitor 962 acts to ensure that residual voltage across input capacitor 962 does not interfere with a future detection cycle.

Preferably, control circuit 750 operates controllable current source 740 during shut down of power from PSE 40, thus advantageously discharging any capacitance across the input of PD interface circuitry 950. Furthermore, the operation of controllable current source 740 during shut down of power from PSE 40 acts to discharge input capacitor 962. Preferably, control circuit 750 operates switch 710 during shut down of power from PSE 40, thus advantageously discharging any capacitance across the input of PD interface circuitry 950 through impedance 720. Furthermore, the operation of switch 710 during shut down of power from PSE 40 acts to discharge input capacitor 962.

Preferably, the rapid discharge of input capacitor 962 enhances the slope of discharge as illustrated by waveforms 530, 630 of FIGS. 4a and 4b. Thus, the discharge of input capacitor 962 advantageously enables early communication as illustrated by waveforms 540, 640 of FIGS. 4a, and 4b by removing any stray currents from the communication loop. In one embodiment the discharge of input capacitor 962 requires approximately 1 second. Preferably, during discharge of input capacitor 962 control circuit 750 ensures a valid DC-MPS through the operation of variable current source 810.

Figure 5E:
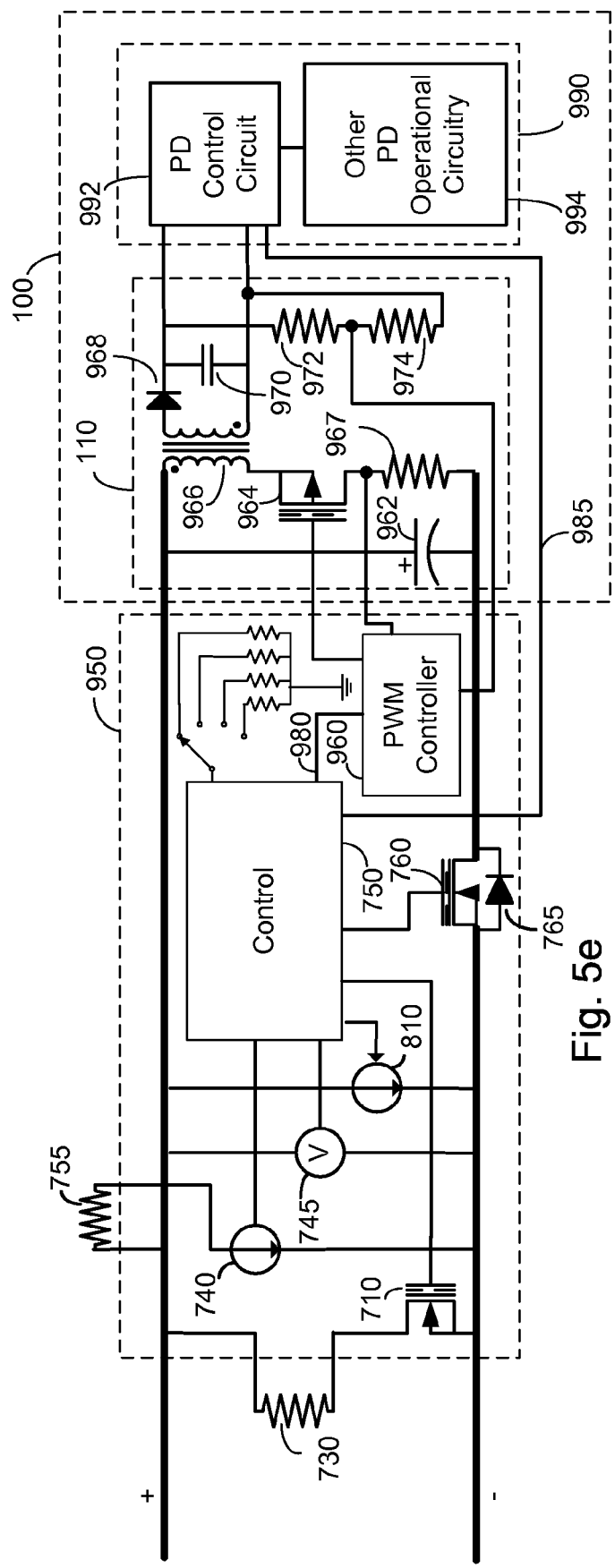
FIG. 5e illustrates a high level block diagram of a fifth embodiment of a powered device in accordance with the principle of the current invention exhibiting an interface circuit, switch and associated powered device operating circuitry.

FIG. 5e illustrates a high level block diagram of a fifth embodiment of a powered device in accordance with the principle of the current invention comprising a PD interface circuitry 950 and associated PD operating circuitry 100. PD interface circuitry 950 comprises: a switch 710 illustrated as a FET switch 710; a controllable current source 740; a voltage sensor 745; a variable current source 810; a control circuit 750; a switch 760 illustrated as FET switch 760; a PWM or resonance controller 960; and a settable priority indicator 790. A signature impedance 730 and classification resistor 755 are externally connected to powered device interface circuit 950. Switch 90 of FIGS. 1a-1c is illustrated as internal N-MOS FET switch 760 exhibiting a parasitic capacitance 765, however this is not meant to be limiting in any way, and switch 760 may be any electronically controlled switch. A positive power lead and a negative power lead are shown; the positive and negative power leads being operatively connected over communication cabling 60 to PSE 40 (not shown) as described above in relation to FIGS. 1a-1c. In an exemplary embodiment polarity is ensured through the use of diode bridges.

PD operating circuitry 100 comprises a DC/DC converter 110 and a PD operational circuitry 990. DC/DC converter 110 comprises: an input capacitor 962; a switch 964 illustrated as FET switch 964; a sense resistance 967; a fly-back transformer 966; a diode 968; an output capacitor 970; and a plurality of feedback resistors 972 and 974. Switch 964 is illustrated as a FET switch however this is not meant to be limiting in any way, and switch 964 may be any electronically controlled switch. It is to be noted that PWM or resonance controller 960 is normally part of DC/DC converter 110, and in this implementation has been placed within powered device interface circuit 950. PD operational circuitry 990 comprises a PD control circuit 992 and an other PD operational circuitry 994.

Switch 710 is connected to enable the presentation of signature impedance 730 across the positive and negative power leads by control circuit 750. Controllable current source 740 is connected across the positive and negative power leads and is operable by control circuit 750. The value of the current transmitted by controllable current source 740 is a function of classification resistor 755. Voltage sensor 745 is connected across the positive and negative power leads and the output of voltage sensor 745 is connected to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. An optional data path 985 between PD control circuit 992 and control circuit 750 is provided. Preferably, optional data path 985 includes isolation circuitry such as an opto-isolator or transformer. Control circuit 750 exhibits an optional communication path 980 to PWM or resonance controller 960.

DC/DC converter 110 is illustrated as being a non-isolated fly-back topology, however this is not meant to be limiting in any way. Other topologies, including, but not limited to, forward, push-pull and bridge are specifically meant to be included without exceeding the scope of the invention. Each of the above topologies may be supplied either isolated or non-isolated without exceeding the scope of the invention. Input capacitor 962, which in an exemplary embodiment comprises an electrolytic capacitor valued between 47 µf and 470 µf, is connected across the positive and negative power leads at the input of DC/DC converter 110. The primary of fly-back transformer 966 is connected through switch 964 and sense resistance 967 across the negative and positive power leads. Switch 964 is operatively connected to an output of PWM or resonance controller 960. The voltage generated across sense resistance 967 is connected as an input to PWM or resonance controller 960. The secondary of fly-back transformer 966 is connected through diode 968 as the power input to PD operational circuitry 720. Output capacitor 970 is connected across the output of DC/DC converter 110. Feedback resistors 972 and 974 form a voltage divider across the output of DC/DC converter 110, and the divided output is connected to an input of PWM or resonance controller 960. In the event that an isolated topology is utilized, the divided output from feedback resistors 972 and 974 is fed through an appropriate isolator to an input of PWM or resonance controller 960.

The output of DC/DC converter 110 is fed to PD operational circuitry 990. PD control circuit 992 is operational to enable other PD operational circuitry 994.

Settable priority indicator 790 is connected to control circuit 750, and is illustrated as a switch, the arm of which is connected to a port of control circuit 750 and whose posts are connected through one of a plurality of resistors of non-equal value to ground. Thus, control circuit 750 is operable to detect the state of settable priority indicator 790 by measuring the resistance to ground. Settable priority indicator 790 is illustrated as a switch with a plurality of non-equal resistances, however this is not meant to be limiting in any way. In another embodiment settable priority indicator 790 comprises a switch whose posts are connected to ports of control circuit 750 and whose arm is connected to a constant voltage point, such as ground. In yet another embodiment, settable priority indicator 790 comprises a software program run on control circuit 750. In yet another embodiment settable priority indicator 790 may be a factory set firmware code stored in control circuit 750. Settable priority indicator 790 thus may be any combination of hardware and software, functional to indicate a priority level indication to control circuit 750. Settable priority indicator 790 may be settable by a user, authorized installation personnel, or a factory set up without exceeding the scope of the invention. Settable priority indicator 790 is illustrated as being connected to control circuit 750, however this is not meant to be limiting in any way. In another embodiment (not shown) settable priority indicator 790 is connected to one of PD control circuit 992 and other PD operational circuitry 994 without exceeding the scope of the invention.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a-4b, control circuit 750 operates controllable current source 740 to present the appropriate classification current across the positive and negative power leads. The value of variable current source 740 is set in accordance with classification resistance 755.

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a-4b. Variable current source 810 may provide any number of levels of current. Communication preferably comprises data corresponding to the priority level indicated by settable priority indicator 790.

Operating current is provided to DC/DC converter 110 by control circuit 750 closing switch 760. Control circuit 750 enables PWM or resonance controller 960 via communication path 980. PWM or resonance controller 960 operates switch 964 to generate an appropriate voltage output of DC/DC converter 110 to be fed to PD operational circuitry 720. Advantageously, communication path 980 is bi-directional, thus PWM or resonance controller 960 which acts as a portion of DC/DC converter 110 is in communication with control circuit 750.

Communication of data from PD control circuit 992 to control circuit 750 is provided by optional data path 985. In one embodiment optional data path 985 is provided with isolation. In another embodiment, optional data path 985 comprises a bi-directional data path such as a UART communication path. As will be described further hereinto below in relation to FIG. 6c, and preferably in relation to the second embodiment illustrated above in relation to FIGS. 4a and 4b, after start up of PD control circuit 992, data is provided from PD control circuit 992 to control circuit 750 via optional data path 985. In the embodiment (not shown) in which settable priority indicator 790 is connected to one of PD circuit 992 and other PD operational circuitry 994, data comprises the priority level indicated by settable priority indicator 790. The information provided to control circuit 750 from PD control circuit 992 is transmitted to PSE 40 as illustrated by waveforms 540, 640 of FIGS. 4a, 4b.

In one embodiment, PD control circuit 992 does not energize other PD operational circuitry 994 until after data has been communicated to control circuit 750 and transmitted to PSE 40. In an exemplary embodiment, this is accomplished by a first turn on of power to PD operating circuitry 100; data communication from PD control circuit 992 to control circuit 750; disconnection of power by control circuit 750 from PD operating circuitry 100; communication from control circuit 750 to PSE 40; and the reconnection of power by control 750 to PD operating circuitry 100. Thus, in one embodiment, during start up of PD control circuit 992 through the reconnection of power, control circuit 750 monitors power consumption and ensures a valid DC-MPS through the operation of variable current source 810. In an exemplary embodiment, information regarding the value of current sensed by sense resistance 967 input to PWM or resonance controller 960 is communicated via communication path 980 to control circuit 750 as an indication of power consumption of PD operating circuitry 100.

It is to be noted that during shut off of FET switch 760, a parasitic path for discharge of input capacitor 962 is present through FET switch 760. Preferably, control circuit 750 maintains the operation of PWM or resonance controller 960 via communication path 980 after opening FET switch 760 so as discharge input capacitor 962. In particular, control circuit 750 operates PWM or resonance controller 960 despite the shut off of FET switch 760, and preferably maintains operation of PWM or resonance controller 960 as long as is practicable. Voltage sense inputs of PWM or resonance controller 960 are in one embodiment transmitted to control circuit 750 via communication path 980 thus enabling control circuit 750 to maintain the operation of PWM or resonance controller 960 only until discharge of capacitor 960. Advantageously, in the event of a loss of power from PSE 40, the operation of PWM or resonance controller 960 is maintained after opening switch 760, thus discharging input capacitor 962. Discharging input capacitor 962 acts to ensure that residual voltage across input capacitor 962 does not interfere with a future detection cycle.

Preferably, control circuit 750 operates controllable current source 740 during shut down of power from PSE 40, thus advantageously discharging any capacitance across the input of PD interface circuitry 950. Furthermore, the operation of controllable current source 740 during shut down of power from PSE 40 acts to discharge input capacitor 962. Preferably, control circuit 750 operates switch 710 during shut down of power from PSE 40, thus advantageously discharging any capacitance across the input of PD interface circuitry 950 through impedance 720. Furthermore, the operation of switch 710 during shut down of power from PSE 40 acts to discharge input capacitor 962.

Preferably, the rapid discharge of input capacitor 962 enhances the slope of discharge as illustrated by waveforms 530, 630 of FIGS. 4a and 4b. Thus, the discharge of input capacitor 962 advantageously enables early communication as illustrated by waveforms 540, 640 of FIGS. 4a, and 4b by removing any stray currents from the communication loop.

Preferably, during discharge of input capacitor 962 control circuit 750 ensures a valid DC-MPS through the operation of variable current source 810.

Figure 6A:
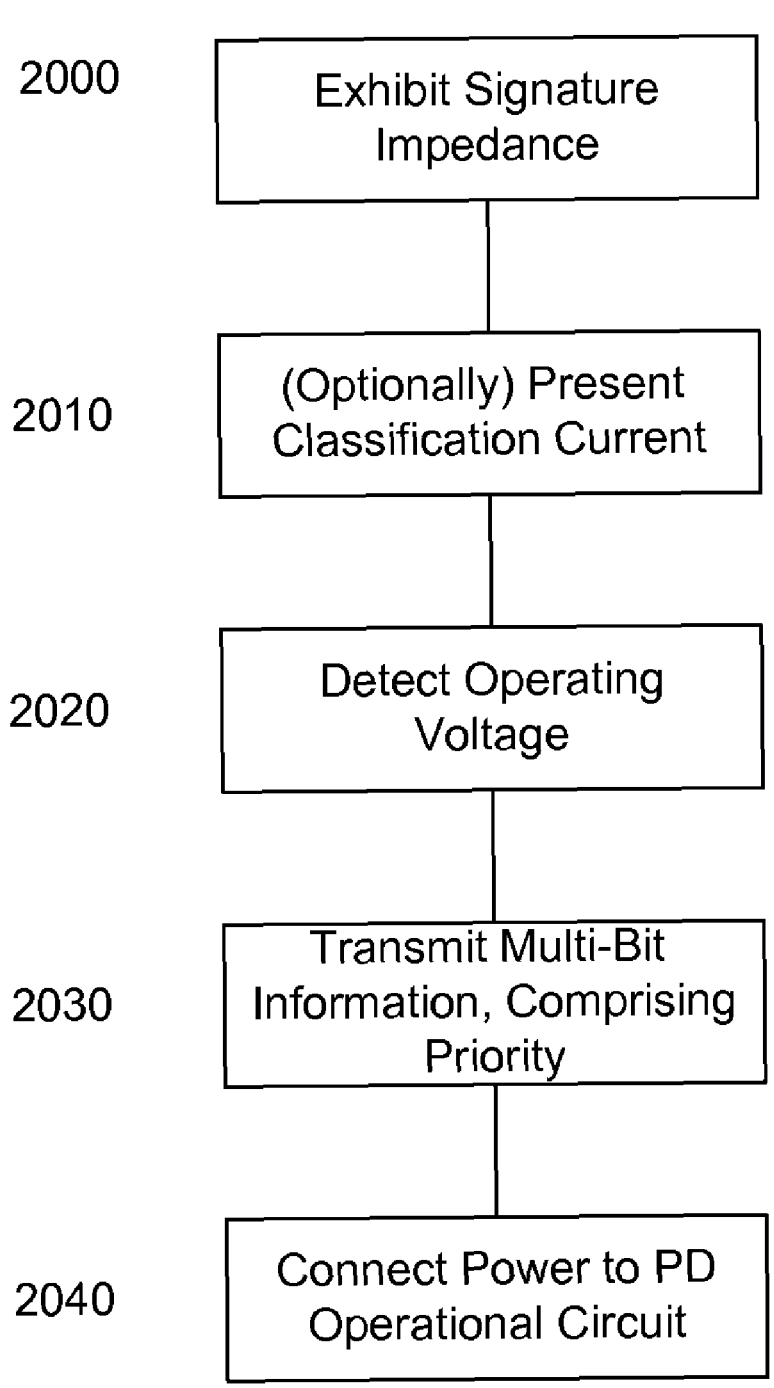
FIG. 6a illustrates a high level flow chart of a first embodiment of the operation of the controller of FIGS. 5a-5e in accordance with the principle of the current invention.

FIG. 6a illustrates a high level flow chart of a first embodiment of the operation of control circuit 750 of FIGS. 5a-5e in accordance with the principle of the current invention. In stage 2000, a signature impedance, such as signature impedance 730, is presented to PSE 40. As indicated above, after completion of the signature phase, preferably control circuit 750 removes signature impedance 730 from the circuit by opening switch 710. In stage 2010, optionally an appropriate classification current is presented to PSE 40. In an exemplary embodiment this is accomplished by controllable current source 740.

In stage 2020, operating voltage such as that described above in relation to waveform 340 of FIG. 2a is detected by voltage sensor 745. In prior art implementations, switch 90 would be closed in response thereby enabling DC/DC converter 110. In the subject invention respective switches 90, 760 remains open thus inhibiting and delaying the operation of DC/DC converter 110. In stage 2030, multi-bit information, comprising priority information reflecting the setting of settable priority indicator 790, is transmitted by utilizing a plurality of current levels. Preferably as part of stage 2030, configuration information is first collected by the control circuit prior to transmission. In one embodiment, as described above in relation to PD interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to PD interface circuitry 800 of FIG. 5b, the plurality of current levels are generated by control circuit 750 operating variable current source 810. In yet another embodiment, as described above in relation to PD interface circuitry 900 of FIG. 5c, the plurality of current levels are generated by control circuit 750 operating variable impedance 910. In one embodiment multi-bit communication is transmitted over an interval less than 300 ms, thus a valid DC-MPS is presented by the operation of PD operational circuitry 720 after the closing of switch 760. In another embodiment the timing and current levels of communication by variable current source 810 and variable impedance 910, respectively, is pre-designed to ensure a valid DC-MPS.

After communication between control circuit 750 and PSE 40 is completed in accordance with stage 2030, in stage 2040, power is connected to PD operational circuitry 720. Preferably, control circuit 750 closes FET switch 760 thereby powering DC/DC converter 110. DC/DC converter 110 outputs power to PD operational circuitry 720 thereby enabling operation.

Figure 6B:
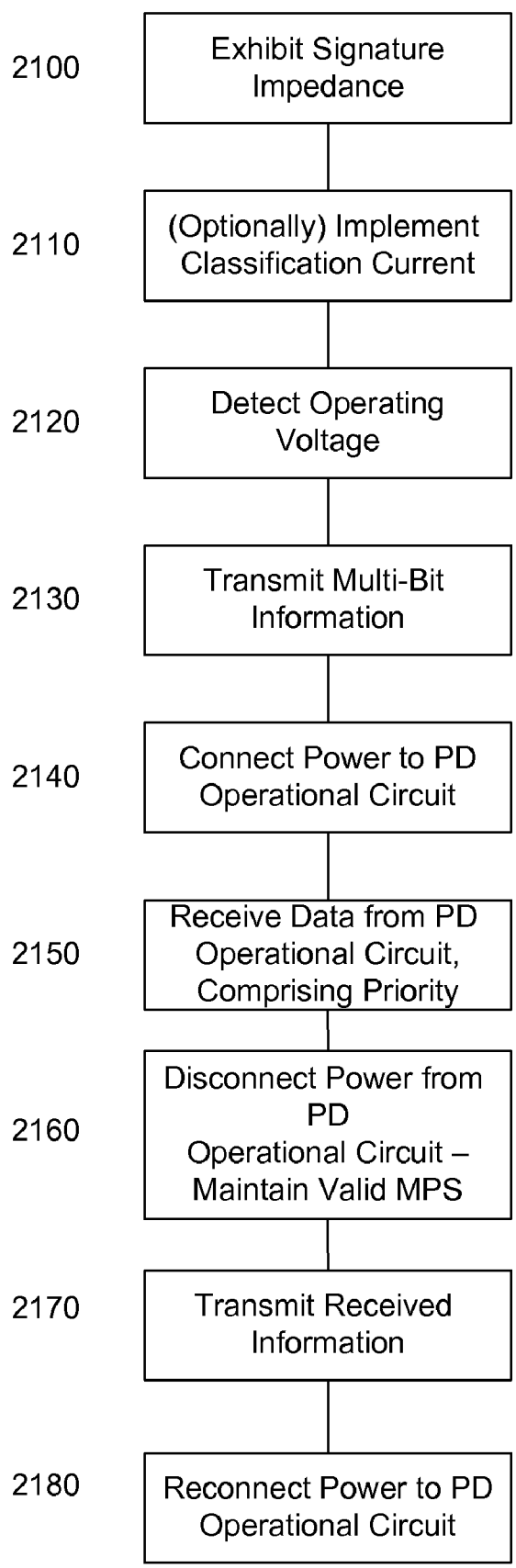
FIG. 6b illustrates a high level flow chart of a second embodiment of the operation of the controller of FIGS. 5a-5e in accordance with the principle of the current invention.

FIG. 6b illustrates a high level flow chart of a second embodiment of the operation of the controller of FIGS. 5a-5e in accordance with the principle of the current invention. In stage 2100, a signature impedance, such as signature impedance 730, is presented to PSE 40. As indicated above, after completion of the signature phase, preferably control circuit 750 removes signature impedance 730 from the circuit by opening switch 710. In stage 2110, optionally an appropriate classification current is presented to PSE 40. In an exemplary embodiment this is accomplished by controllable current source 740.

In stage 2120, operating voltage such as that described above in relation to waveform 340 of FIG. 2a is detected. In prior art implementations, switch 90 would be closed in response thereby enabling DC/DC converter 110. In the subject invention respective switches 90, 760 remains open thus inhibiting and delaying the operation of DC/DC converter 110. In stage 2130, multi-bit information is transmitted by utilizing a plurality of current levels. Preferably as part of stage 2030, configuration information is first collected by the control circuit prior to transmission. In one embodiment, as described above in relation to PD interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to PD interface circuitry 800 of FIG. 5b, the plurality of current levels are generated by control circuit 750 operating variable current source 810. In yet another embodiment, as described above in relation to PD interface circuitry 900 of FIG. 5c, the plurality of current levels are generated by control circuit 750 operating variable impedance 910. In one embodiment multi-bit communication is transmitted over an interval less than 300 ms, thus a valid DC-MPS is presented by the operation of PD operational circuitry 720 after the closing of switch 760. In another embodiment the timing and current levels of communication by variable current source 810 and variable impedance 910, respectively, is pre-designed to ensure a valid DC-MPS.

After communication between control circuit 750 and PSE 40 is completed, in stage 2140 power is connected to PD operational circuitry 720. Preferably, control circuit 750 closes FET switch 760 thereby powering DC/DC converter 110. After start up, DC/DC converter 110 outputs power to PD operational circuitry 720 thereby enabling operation. As part of an initialization routine of PD operational circuitry 720, preferably data regarding PD operational circuitry 720, preferably comprising priority information reflecting the setting of settable priority indicator 790, is transmitted over optional data path 770 to control circuit 750. Thus, in stage 2150 data comprising priority information is received from PD operational circuitry 720. The data received preferably further comprises information regarding one or more of temperature, results of built in testing, type of PD operational circuitry 720 and maximum current draw of PD operational circuitry. In an exemplary embodiment, PD operational circuitry 720 comprises an I.P. telephone powered by PSE 40, and the setting of settable priority indicator 790 is indicative of the priority for which power from PSE 40 is to be supplied. In an exemplary embodiment, current draw is monitored during stage 2150 and in the event that current draw is insufficient DC-MPS is maintained by the operation of one of variable current source 810, controllable and variable impedance 910. In the event that valid data is not received in stage 2150 a timeout enables continuation to the next stage.

In stage 2160 power is disconnected from PD operational circuitry 720. In an exemplary embodiment, control circuit 750 opens FET switch 760 thereby disconnecting power from DC/DC converter 110. Preferably, as described above in relation to the embodiment of FIG. 5d, the input capacitance and input capacitor 962 are discharged by the operation by control circuit 750 of at least one of the classification current source, the signature impedance, and PWM or resonance controller 960. In an exemplary embodiment, a valid DC-MPS is maintained during discharge of the input capacitance and input capacitor 962 by the operation of one of variable current source 810, controllable and variable impedance 910. After settling of any momentary transients, and the discharge of any input capacitance in stage 2170 multi-bit information comprising priority information received from PD operational circuitry 720 is transmitted to PSE 40. In the event that no valid information has been received, a null message is sent.

Preferably, the multi-bit information is transmitted by utilizing a plurality of current levels. In one embodiment, as described above in relation to PD interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to PD interface circuitry 800 of FIG. 5b, the plurality of current levels are generated by control circuit 750 operating variable current source 810. In yet another embodiment, as described above in relation to PD interface circuitry 900 of FIG. 5c, the plurality of current levels are generated by control circuit 750 operating variable impedance 910.

After the data is transmitted in accordance with stage 2170, in stage 2180 power is connected to PD operational circuitry 720. Preferably, control circuit 750 closes FET switch 760 thereby powering DC/DC converter 110, which outputs power to PD operational circuitry 720 thereby enabling operation.

The above has been described in an embodiment in which PD interface circuitry 800, 900 transmits received priority information by shutting down PD operational circuitry 720, however this is not meant to be limiting in any way. In another embodiment the received settable priority information is stored in a non-volatile memory of PD interface circuitry 800, 900 (not shown), and is sent by stage 2130 in a subsequent start up by PSE 40.

Figure 6C:
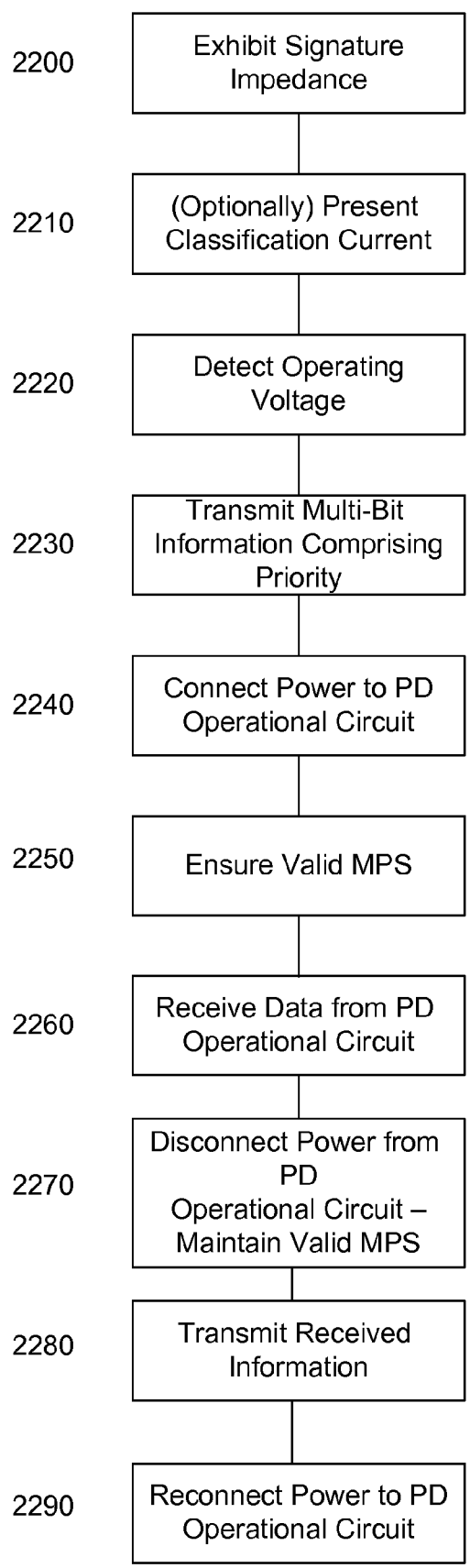
FIG. 6c illustrates a high level flow chart of an embodiment of the operation of the controller of FIGS. 5e in accordance with the principle of the current invention.

FIG. 6c illustrates a high level flow chart of an embodiment of the operation of the controller of FIG. 5e in accordance with the principle of the current invention. In stage 2200, a signature impedance, such as signature impedance 730, is presented to PSE 40. As indicated above, after completion of the signature phase, preferably control circuit 750 removes signature impedance 730 from the circuit by opening switch 710. In stage 2210, optionally an appropriate classification current is presented to PSE 40. In an exemplary embodiment this is accomplished by the operation of controllable current source 740 to PSE 40.

In stage 2220, operating voltage such as that described above in relation to waveform 340 of FIG. 2a is detected. In an exemplary embodiment this is accomplished by the operation of voltage sensor 745. In prior art implementations, switch 90 would be closed in response thereby enabling DC/DC converter 110. In the subject invention respective switches 90, 760 remains open thus inhibiting and delaying the operation of DC/DC converter 110. In stage 2230, multi-bit information, comprising priority information reflecting the setting of settable priority indicator 790, is transmitted by utilizing a plurality of current levels. Preferably as part of stage 2230, configuration information is first collected by the control circuit prior to transmission. In one embodiment, as described above in relation to PD interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to PD interface circuitry 800 of FIG. 5b, the plurality of current levels are generated by control circuit 750 operating variable current source 810. In yet another embodiment, as described above in relation to PD interface circuitry 900 of FIG. 5c, the plurality of current levels are generated by control circuit 750 operating variable impedance 910. In one embodiment multi-bit communication is transmitted over an interval less than 300 ms, thus a valid DC-MPS is presented by the operation of PD operational circuitry 990 after the closing of switch 760. In another embodiment the timing and current levels of communication by variable current source 810 and variable impedance 910, respectively, is pre-designed to ensure a valid DC-MPS.

After communication between control circuit 750 and PSE 40 is completed, in stage 2240 power is connected to PD operational circuitry 720. Preferably, control circuit 750 closes FET switch 760 thereby powering DC/DC converter 110. After start up, DC/DC converter 110 outputs power to PD operational circuitry 990 thereby enabling operation. As part of an initialization routine of PD operational circuitry 990, PD control circuit 992 prevents the operation of other PD operational circuitry 994, and transmits data regarding PD operational circuitry 990 over data path 985 to control circuit 750. In this embodiment control circuit 750 is unable to rely on PD operational circuitry 990 to provide a valid DC-MPS, and thus in stage 2250 current draw of PD operational circuitry 990 is monitored to ensure a valid DC-MPS. In the event that insufficient current is drawn, control circuit 750 operates one or more of switch 710, switch 730 and variable current source 810 to ensure a valid DC-MPS.

In stage 2260 data is received from PD control circuit 992. The data received preferably comprises information regarding one or more of temperature, results of built in testing, type of PD operational circuitry 990 and maximum power draw of PD operational circuitry 990. In the event that valid data is not received in stage 2260 a timeout enables continuation to the next stage.

In stage 2270 power is disconnected from PD operational circuitry 990. In an exemplary embodiment, control circuit 750 opens FET switch 760 thereby disconnecting power from DC/DC converter 110. Preferably, as described above, the input capacitance and input capacitor 962 are discharged by the operation by control circuit 750 of at least one of the classification current source, the signature impedance, and PWM or resonance controller 960. In an exemplary embodiment, a valid DC-MPS is maintained during discharge of the input capacitance and input capacitor 962 by the operation of one of variable current source 810, controllable and variable impedance 910. After settling of any momentary transients, in stage 2280 multi-bit information comprising information received from PD control circuit 992 is transmitted to PSE 40. Preferably, the multi-bit information is transmitted by utilizing a plurality of current levels. In the event that no valid information has been received in stage 2260, a null message is transmitted. In one embodiment, as described above in relation to PD interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to PD interface circuitry 800 of FIG. 5b, the plurality of current levels are generated by control circuit 750 operating variable current source 810. In yet another embodiment, as described above in relation to PD interface circuitry 900 of FIG. 5c, the plurality of current levels are generated by control circuit 750 operating variable impedance 910.

After the data is transmitted in accordance with stage 2280, in stage 2290 power is connected to PD operational circuitry 720. Preferably, control circuit 750 closes FET switch 760 thereby powering DC/DC converter 110, which outputs power to PD operational circuitry 990. In one embodiment PD control circuit 992 senses the reestablishment of power, or in another embodiment receives notification from control circuit 750 over optional data path 985 that power is now being enabled without an immediate shut down as described above in relation to stage 2270, and enables the operation of other PD operational circuitry 994.

Figure 7A:
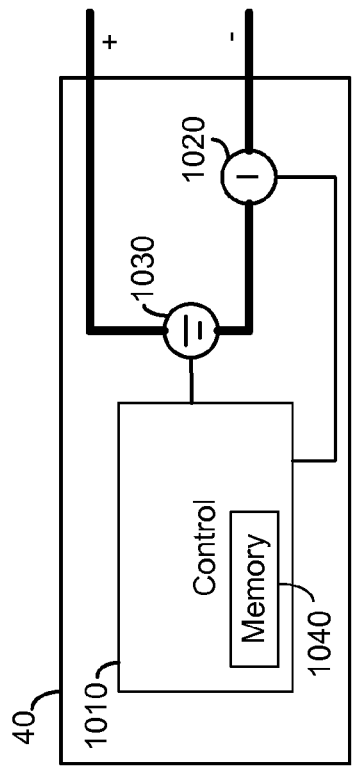
FIG. 7a illustrates an embodiment of power sourcing equipment operative to detect the communication in accordance with a principle of the current invention.

FIG. 7a illustrates an embodiment of PSE 40 operative to detect the communication of the current invention. PSE 40 comprises control 1010, controlled current limited power source 1030, current sensor 1020 and memory 1040. Current sensor 1020 is shown being connected on the return of the output from controlled current limited power source 1030 however this is not meant to be limiting in any way. Control 1010 operates controlled current limited power source 1030 in a manner as described above in relation to FIG. 2a to detect a compatible PD in accordance with the above standard, optionally obtain classification information and then to supply current limited power to the PD. Current sensor 1020 is operative to supply control 1010 with information regarding the amount of current being drawn by the PD. In one embodiment current sensor 1020 comprises a sense resistor in combination with a voltage comparator having at least one fixed reference voltage. In yet another embodiment current sensor 1020 comprises a sense resistor in combination with an A/D converter thereby outputting a digital representation of the amount of current.

In operation, control 1010 senses, via current sensor 1020, a plurality of current levels during a predetermined time after operating power has been enabled to an attached PD. The current levels, representing data, are decoded and converted to data. The data is stored, as required, in memory 1040.

Figure 7B:
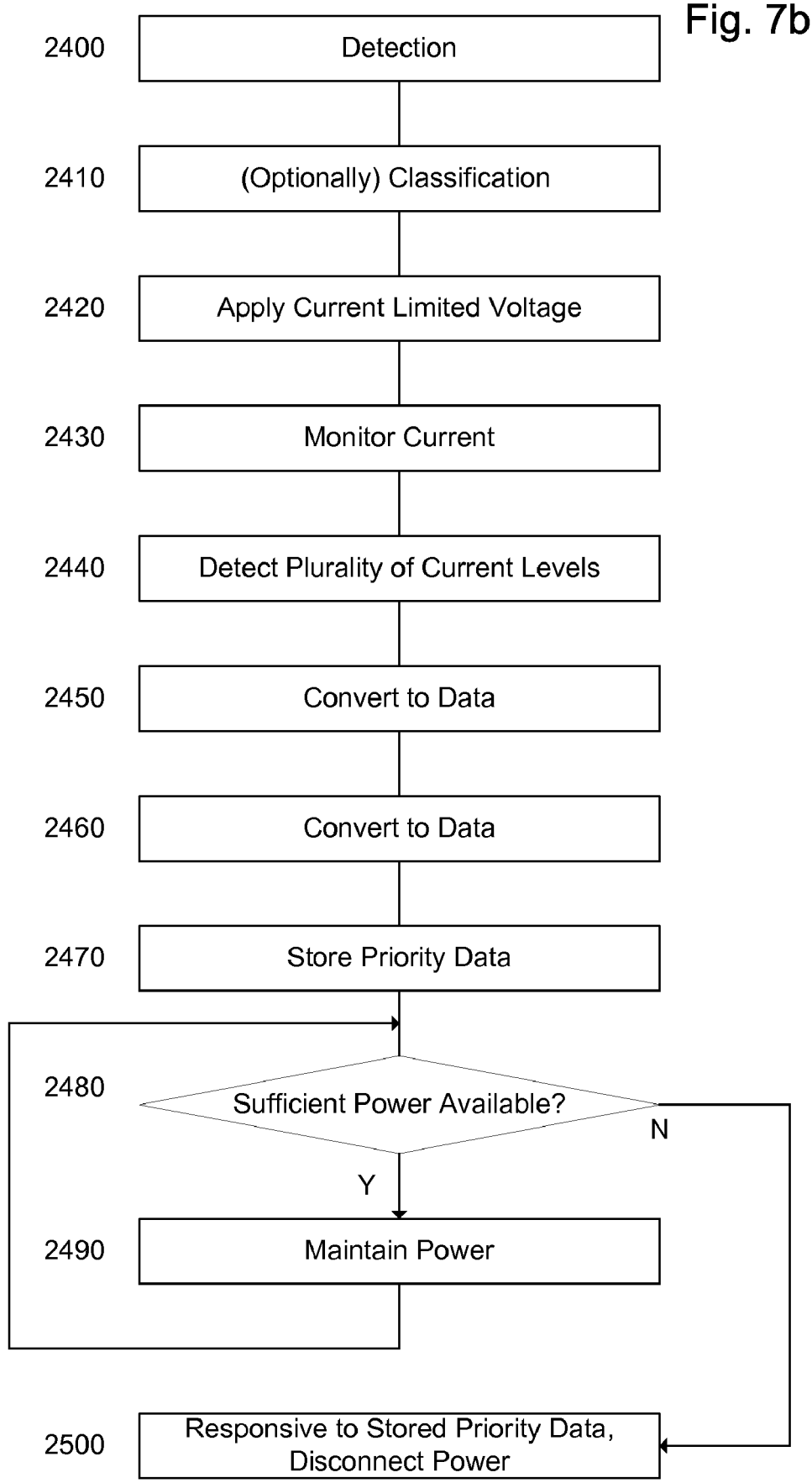
FIG. 7b illustrates a high level flow chart of an embodiment of the operation of the control of FIG. 7a in accordance with a principle of the current invention, to receive the settable priority form the PD and disable powering responsive to the received priority.

FIG. 7b illustrates a high level flow chart of an embodiment of the operation of the control of FIG. 7a. In stage 2400 detection of a compatible PD as described above in relation to waveform 310 of FIG. 2a is attempted. In the event that a compatible PD is detected, in stage 2410 optionally classification is attempted as described above in relation to waveform 320 of FIG. 2a. In stage 2420 current limited voltage is supplied to the PD as described above in relation to waveforms 330 and 340 of FIG. 2a.

In stage 2430 the current being consumed by the PD is monitored. In an exemplary embodiment initial communication is to occur within a pre-determined time after the application of current limited voltage. In a further exemplary embodiment the pre-determined time is 100 ms. In the event of an expected second communication as described above in relation to waveforms 540 and 640 of FIGS. 4a and 4b, preferably in the first communication the time for the second communication is transmitted by the PD. Thus, based on the data received in the first communication, communication is expected at a predetermined time.

In stage 2440 a plurality of current levels of the current monitored in stage 2430 is detected. Preferably the plurality of current levels is detected during the pre-determined periods described above. In stage 2450 the plurality of current levels detected in stage 2440 is converted to data. Thus, control 1010 receives and decodes digital multi-bit data transmitted from the PD to the PSE. In stage 2460, the data converted in stage 2450 is stored in memory 1040.

In stage 2470, the total amount of power available in the system is compared to the amount of power being drawn by a plurality of connected PDs. In an exemplary embodiment, as described above in relation to FIG. 1d, a powering system having limited capabilities is connected to supply power to a plurality of PSEs, each connected to a respective PD, and under control of a master controller. In the event of a shortage of power, for example during a total or partial power failure when power is being supplied by a UPS, available power is less than the power being drawn and one or more PDs are to be disabled. Preferably, as described for example in U.S. Pat. No. 6,473,608 incorporated by reference above, priority is maintained with lower priority ports being disabled prior to the disabling of higher priority ports. Advantageously, in accordance with a principle of the invention, priority information as indicated by settable priority indicator 790, is supplied automatically to the PSE.

In the event sufficient power is available, in stage 2480 power to all PDs receiving power is maintained. Stage 2470 is again performed, preferably after a suitable delay.

In the event that in stage 2470 sufficient power is not available, in stage 2490 at least one PD 100 is disabled in accordance with the priority data stored by the operation of stage 2460 in memory 1040.

The present embodiments thus enable the transmission of information, comprising priority information, from PD interface circuitry to an associated PSE prior to supplying power to PD operational circuitry, in particular by not enabling a DC/DC converter of the PD operational circuitry. In one embodiment, communication occurs after the PSE enables the PD by supplying an appropriate voltage; however an isolating switch between the PD interface circuitry and the PD operational circuitry is kept open.

In another embodiment, subsequent to the communication, the isolating switch is closed thereby enabling the PD operational circuitry. Data is received by the PD interface circuitry from the PD operational circuitry, and subsequently the isolating switch is again opened, thereby disabling the PD operational circuitry. Data indicative of the information received from the PD operational circuitry is then communicated by the PD interface circuitry while the PD operational circuitry is disabled. The isolating switch is subsequently again closed thereby enabling the PD operational circuitry. The invention also enables a PSE operable to decipher the communication from the PD interface circuitry.

In one embodiment the priority information is supplied to the PD interface circuit, preferably by means of a user settable switch. In another embodiment the priority information is supplied to the PD operational circuitry, preferably by one of a user settable switch and a software routine. The priority information is utilized by the PSE to maintain power, or disable power, responsive to total power availability.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A method for communicating a settable priority from a powered device to power sourcing equipment connected thereto by communication cabling, the method comprising:
    sensing an operating voltage level associated with a remote powering of the powered device from the power sourcing equipment via the communication cabling, said sensed operating voltage exceeding a predetermined value; and
    prior to connecting the remote power sourced from the power sourcing equipment via the communication cabling to operational circuitry of the powered device, and subsequent to said sensing, transmitting multi-bit data to the power sourcing equipment over the communication cabling by modulating a current flow between the power sourcing equipment and the powered device via the communication cabling, said multi-bit data comprising settable priority information, said transmitting responsive to said sensing.

2. A method according to claim 1, further comprising:
    subsequent to said transmitting, connecting the remote power sourced from the power sourcing equipment via the communication cabling to said operational circuitry.

3. A method according to claim 1, wherein said modulating of said current flow comprises impressing at least 2 disparate current levels.

4. A method according to claim 1, wherein said modulating of said current flow comprises impressing at least 3 disparate current levels.

5. A method according to claim 1, wherein said multi-bit data further comprises one of information indicative of a maximum power level and information indicative of temperature.

6. A method according to claim 1, wherein said settable priority information is settable by one of a user, an authorized installation personnel, or a factory set up.

7. A method according to claim 1, wherein said settable priority information is settable by one of a switch and a software program.

8. A method for communicating settable priority data from a powered device receiving power over communication cabling to power sourcing equipment supplying the received power, the method comprising:
    sensing an operating voltage level associated with a remote powering of the powered device from the power sourcing equipment via the communication cabling, said sensed operating voltage exceeding a predetermined value;
    prior to connecting the remote power sourced from the power sourcing equipment via the communication cabling to operational circuitry of the powered device, and subsequent to said sensing, transmitting first multi-bit data from the powered device to the power sourcing equipment;
    subsequent to said transmitting said first multi-bit data, connecting the remote power sourced from the power sourcing equipment via the communication cabling to the powered device operational circuitry;
    subsequent to said connecting, receiving information from the powered device operational circuitry;
    subsequent to said receiving, disconnecting said connected remote power from the powered device operational circuitry; and
    subsequent to said disconnecting, and prior to reconnecting said remote power to said operational circuitry, transmitting second multi-bit data from the powered device to the power sourcing equipment, said second multi-bit data being a function of said received information,
    at least one of said first multi-bit data and said second multi-bit data being a function of a settable priority.

9. A method according to claim 8, further comprising after said transmitting second multi-bit data:
    re-connecting the remote power sourced from the power sourcing equipment via the communication cabling to the operational circuitry.

10. A method according to claim 8, wherein at least one of said transmitting first multi-bit data and transmitting second multi-bit data comprises modulating a current flow.

11. A method according to claim 10, wherein said modulating of said current flow comprises impressing at least 2 disparate current levels.

12. A method according to claim 10, wherein said modulating of said current flow comprises impressing at least 3 disparate current levels.

13. A method according to claim 8, wherein said second multi-bit data further comprises information indicative of one of temperature, result of built in testing, type and maximum power draw.

14. A method according to claim 8, wherein said first multi-bit data comprises information indicative of a maximum power level.

15. A method according to claim 8, wherein said settable priority is user settable.

16. A method according to claim 8, wherein said settable priority is settable by one of a user, an authorized installation personnel, or a factory set up.

17. A method according to claim 8, wherein said received information from the powered device operational circuitry comprises said settable priority.

18. A powered device interface circuit comprising:
    a control circuit;
    a voltage sensor in communication with said control circuit;
    an isolating switch operating means responsive to said control circuit, said isolating switch operating means arranged to connect remote power received via a communication cabling from a power sourcing equipment to operational circuitry of a powered device associated with the powered device interface circuit;
    a settable priority indicator; and
    a transmitter, comprising one of a variable impedance and a variable current source, responsive to said control circuit, arranged to transmit multi-bit data over the communication cabling to the power sourcing equipment,
    said control circuit arranged to:
    sense an operating voltage associated with remote powering of the powered device from the power sourcing equipment via the communication cabling, said sensed operating voltage exceeding a predetermined value and sensed responsive to said voltage sensor; and
    prior to connecting the remote power sourced via the communication cabling to operational circuitry associated with the powered device interface by said isolating switch operating means, and responsive to said sensed operating voltage, transmit first multi-bit data, comprising settable priority information, to the power sourcing equipment via the communication cabling by said transmitter, said settable priority information being a function of the setting of said settable priority indicator.

19. A powered device interface circuit according to claim 18, wherein said control circuit is arranged to vary one of said variable impedance and said variable current source to each of at least two disparate values.

20. A powered device interface circuit according to claim 18, wherein said control circuit is arranged to vary one of said variable impedance and said variable current source to each of at least three disparate values.

21. A powered device interface circuit according to claim 18, wherein said first multi-bit data further comprises information indicative of a maximum power level.

22. A powered device interface circuit according to claim 18, further comprising:
   an isolation switch responsive to said isolating switch operating means; and
   the operational circuitry arranged to receive the remote power responsive to said isolating switch,
   wherein said control circuit is further arranged to:
   operate said isolating switch operating means so as to close said isolating switch thereby connecting said remote power to said operational circuitry;
   receive information from said operational circuitry;
   operate said isolating switch operating means so as to open said isolating switch thereby disconnecting said received power from said operational circuitry; and
   subsequent to said disconnecting, transmit second multi-bit data to the power sourcing equipment via the communication cabling by said transmitter, said second multi-bit data comprising an indication of said received information.

23. A powered device interface according to claim 22, wherein said control circuit is further arranged subsequent to transmitting said second multi-bit data, to operate said isolating switch operating means so as to close said isolating switch thereby connecting said remote power to said operational circuitry.

24. A powered device interface circuit according to claim 22, wherein said second multi-bit data comprises information regarding one of temperature, result of built in testing, maximum current draw and type.

25. A powered device interface circuit according to claim 22, further comprising one of a pulse width modulator and a resonance controller responsive to said control circuit, wherein said control circuit is further arranged to operate said one of a PWM and a resonance controller after said disconnecting via said isolating switch and prior to said transmitting second multi-bit information,
   whereby said one of a pulse width modulator and a resonance controller discharges an input capacitor thereby enabling said transmitting of said second multi-bit information.

26. A powered device interface circuit according to claim 18, wherein said settable priority indicator comprises one of a switch, a software program operable on said control circuit and a firmware code associated with said control circuit.

27. A powered device interface circuit comprising:
   a control circuit;
   a voltage sensor in communication with said control circuit;
   an isolating switch operating means responsive to said control circuit, said isolating switch operating means arranged to connect remote power received via a communication cabling from a power sourcing equipment to operational circuitry of a powered device associated with the powered device interface circuit;
   a settable priority indicator; and
   a transmitter, responsive to said control circuit, arranged to transmit multi-bit data over the communication cabling to the power sourcing equipment,
   said control circuit arranged to:
   sense an operating voltage associated with remote powering of the powered device from the power sourcing equipment via the communication cabling, said sensed operating voltage responsive to said voltage sensor and exceeding a predetermined value; and
   prior to connecting the remote power sourced via the communication cabling to operational circuitry associated with the powered device interface by said isolating switch operating means, transmit first multi-bit data to the power sourcing equipment via the communication cabling by said transmitter;
   receive information from said operational circuitry;
   operate said isolating switch operating means so as to open said isolating switch thereby disconnecting said received power from said operational circuitry; and
   subsequent to said disconnecting, transmit second multi-bit data to the power sourcing equipment via the communication cabling by said transmitter, said second multi-bit data comprising an indication of said received information,
   one of said first multi-bit data and said second multi-bit data being a function of the setting of said settable priority indicator.

28. A powered device interface circuit according to claim 27, wherein said transmitter comprises one of a variable impedance and a variable current source.

29. A powered device interface circuit according to claim 27, wherein said settable priority indicator comprises one of a switch, a software program operable on said control circuit and a firmware code associated with said control circuit.

30. A local area network comprising:
   a power sourcing equipment;
   a powered device; and
   a communication cabling connecting said power sourcing equipment to said powered device;
   said powered device comprising:
   (a) a control circuit;
   (b) a settable priority indicator;
   (c) an isolating switch responsive to said control circuit;
   (d) an operational circuitry arranged to be connected to a remote power sourced from said power sourcing equipment via said isolating switch; and
   (e) a voltage sensor in communication with said control circuit, said control circuit arranged to:
   sense an operating voltage associated with the remote power sourced from the power sourcing equipment via the communication cabling, said sensed operating voltage responsive to said voltage sensor and exceeding a predetermined value; and
   prior to connecting the remote power to the operational circuit via the isolating switch, and responsive to said sensed operating voltage, transmit multi-bit data comprising priority information from said settable priority indicator over said communication cabling to said power sourcing equipment.

31. An integrated circuit for use with a powered device comprising:
   (a) a control circuit;
   (b) a means for receiving settable priority information;
   (c) an isolating switch operating means responsive to said control circuit, said isolating switch operating means arranged to connect remote power received via a communication cabling from a power sourcing equipment to operational circuitry of a powered device associated with the integrated circuit for use with the powered device; and (d) a voltage sensor in communication with said control circuit, said control circuit arranged to:

sense an operating voltage associated with remote powering of the powered device from the power sourcing equipment via the communication cabling, said sensed operating voltage exceeding a predetermined value and sensed responsive to said voltage sensor; and prior to connecting the remote power sourced via the communication cabling to operational circuitry associated with the powered device interface by said isolating switch operating means, and responsive to said sensed operating voltage, transmit multi-bit data comprising said settable priority information via the communication cabling to the power sourcing equipment.

* * * * *